(12) United States Patent
Kurasawa et al.

(10) Patent No.: US 9,791,972 B2
(45) Date of Patent: Oct. 17, 2017

(54) SENSOR-EQUIPPED DISPLAY DEVICE

(71) Applicant: Japan Display Inc., Tokyo (JP)

(72) Inventors: Hayato Kurasawa, Tokyo (JP);
Hiroshi Mizuhashi, Tokyo (JP); Koji Ishizaki, Tokyo (JP); Yoshihiro Watanabe, Tokyo (JP); Masanobu Ikeda, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 14/661,530

(22) Filed: Mar. 18, 2015

(65) Prior Publication Data
US 2015/0268795 A1    Sep. 24, 2015

(30) Foreign Application Priority Data

Mar. 18, 2014 (JP) .................................. 2014-054472
Mar. 20, 2014 (JP) .................................. 2014-058134

(51) Int. Cl.
*G06F 3/043*   (2006.01)
*G06F 3/041*   (2006.01)
*G06F 3/044*   (2006.01)

(52) U.S. Cl.
CPC ............ *G06F 3/0418* (2013.01); *G06F 3/044* (2013.01); *G06F 2203/04103* (2013.01)

(58) Field of Classification Search
CPC .................. G06F 3/0418; G06F 3/044; G06F 2203/04103
USPC ................... 345/173–179; 178/118.01–20.04
See application file for complete search history.

(56) References Cited

U.S. PATENT DOCUMENTS

| 6,689,458 | B1 | 2/2004 | Mikoshiba et al. |
| 8,259,078 | B2 * | 9/2012 | Hotelling ............ G02F 1/13338 345/156 |
| 9,041,636 | B2 * | 5/2015 | Fujioka ................ G09G 3/3648 345/173 |
| 2008/0062147 | A1 * | 3/2008 | Hotelling ............ G02F 1/13338 345/174 |

(Continued)

FOREIGN PATENT DOCUMENTS

| CN | 102375639 A | 3/2012 |
| CN | 102419486 A | 4/2012 |

(Continued)

OTHER PUBLICATIONS

Office Action issued in KR Application 1020150034861, mailed Apr. 27, 2016.

(Continued)

*Primary Examiner* — Vinh Lam
(74) *Attorney, Agent, or Firm* — K&L Gates LLP

(57) ABSTRACT

According to one embodiment, a sensor-equipped display device includes a display panel, first driver, and second driver. The display panel includes a common electrode, a pixel electrode, a detection electrode, a connection line and lead line. The first driver supplies a common driving signal to the common electrode during a display drive time and supplies a sensor driving signal to the common electrode during a sensing drive time. The second driver detects a sensor output value during the sensing drive time. The lead line and the common electrode are apart from each other with a certain gap at least during the sensing drive time.

8 Claims, 24 Drawing Sheets

(56) References Cited

U.S. PATENT DOCUMENTS

| | | | |
|---|---|---|---|
| 2008/0158167 A1* | 7/2008 | Hotelling | G06F 3/0416 345/173 |
| 2009/0107737 A1* | 4/2009 | Reynolds | G06F 3/0202 178/18.06 |
| 2010/0194699 A1 | 8/2010 | Chang | |
| 2010/0238134 A1* | 9/2010 | Day | G06F 3/0412 345/174 |
| 2011/0304571 A1* | 12/2011 | Kim | G02F 1/13338 345/173 |
| 2012/0044167 A1* | 2/2012 | Nakanishi | G06F 3/0412 345/173 |
| 2012/0050217 A1 | 3/2012 | Noguchi et al. | |
| 2012/0062511 A1* | 3/2012 | Ishizaki | G06F 3/044 345/174 |
| 2012/0075237 A1 | 3/2012 | Ikeda et al. | |
| 2013/0016065 A1 | 1/2013 | Reynolds et al. | |
| 2013/0063375 A1* | 3/2013 | Yoshida | G06F 3/0416 345/173 |
| 2013/0176273 A1* | 7/2013 | Li | G06F 3/044 345/174 |
| 2013/0229382 A1* | 9/2013 | Huang | G06F 3/044 345/174 |
| 2013/0293515 A1* | 11/2013 | Fujioka | G06F 3/044 345/174 |
| 2013/0328796 A1* | 12/2013 | Al-Dahle | G06F 3/041 345/173 |
| 2014/0062937 A1 | 3/2014 | Schwartz et al. | |
| 2014/0152621 A1* | 6/2014 | Okayama | G06F 3/0416 345/174 |
| 2014/0225869 A1* | 8/2014 | Hsu | G06F 3/044 345/175 |
| 2014/0333563 A1* | 11/2014 | Saitoh | G09G 3/3648 345/173 |
| 2015/0002446 A1* | 1/2015 | Ayzenberg | G06F 3/044 345/174 |
| 2015/0091849 A1* | 4/2015 | Ludden | G06F 3/0412 345/174 |
| 2015/0268784 A1* | 9/2015 | Kallassi | G01R 27/2605 345/174 |

FOREIGN PATENT DOCUMENTS

| | | |
|---|---|---|
| CN | 103294256 A | 9/2013 |
| JP | 2011-090443 | 5/2011 |
| JP | 2011180401 | 9/2011 |
| JP | 2012-048295 A | 3/2012 |
| JP | 2012-068981 A | 4/2012 |
| JP | 2012-208749 | 10/2012 |
| JP | 2013-134317 A | 7/2013 |
| JP | 2013-254515 A | 12/2013 |
| JP | 2014-016403 A | 1/2014 |
| KR | 20120077451 | 7/2012 |
| KR | 101325918 | 11/2013 |
| TW | 187202 | 7/1992 |
| WO | 0204997 | 1/2002 |

OTHER PUBLICATIONS

Office Action issued in TW Application 104107093, mailed Dec. 25, 2015, 6 pages.

Japanese Office Action (with English translation) issued Jan. 16, 2017 in corresponding Japanese application No. 2014-058134 (4 pages).

State Intellectual Property Office for the People's Republic of China, Office Action for Chinese Patent Application No. 2015102555521 (related to above-captioned patent application), dated Aug. 31, 2017.

* cited by examiner

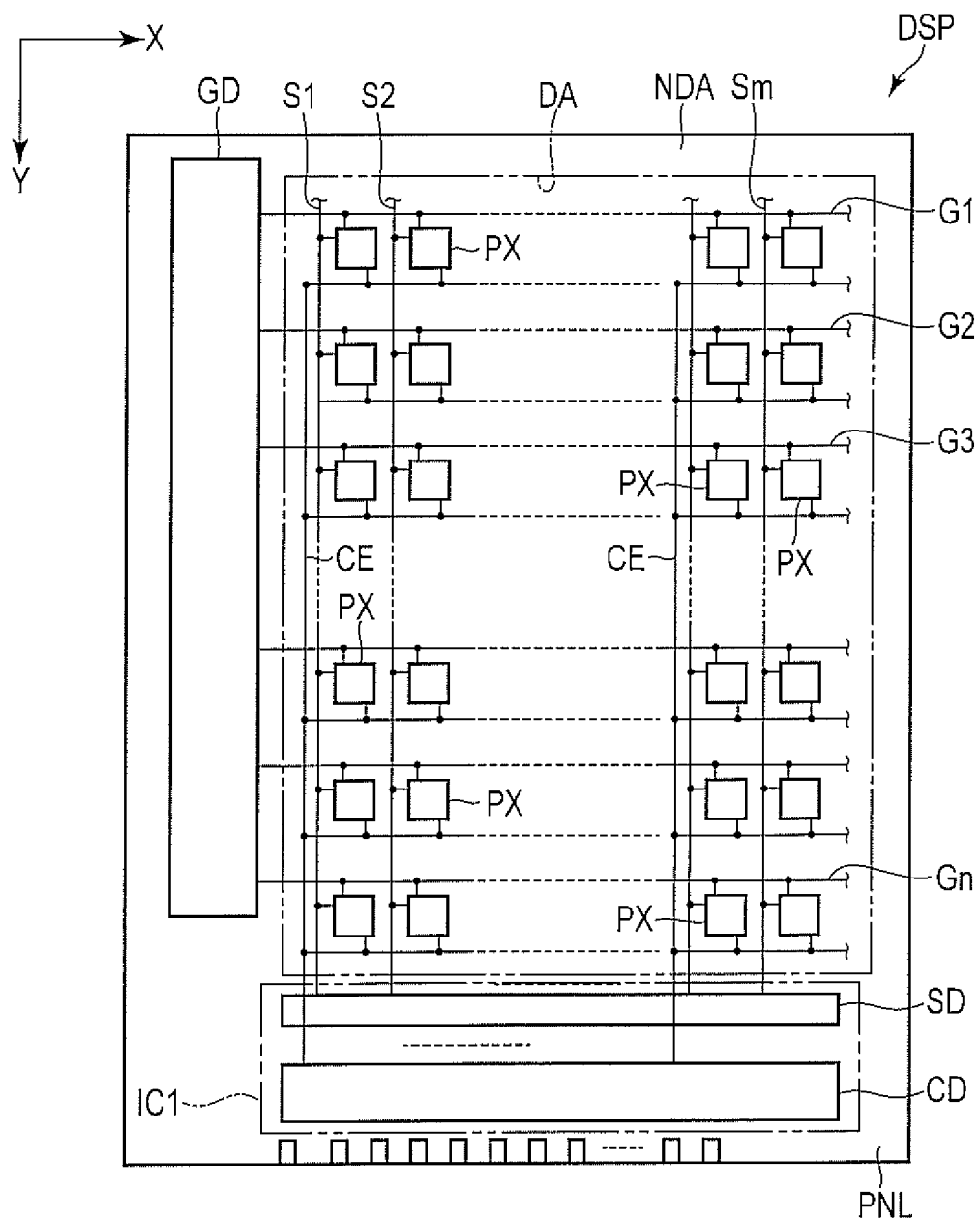
F I G. 2

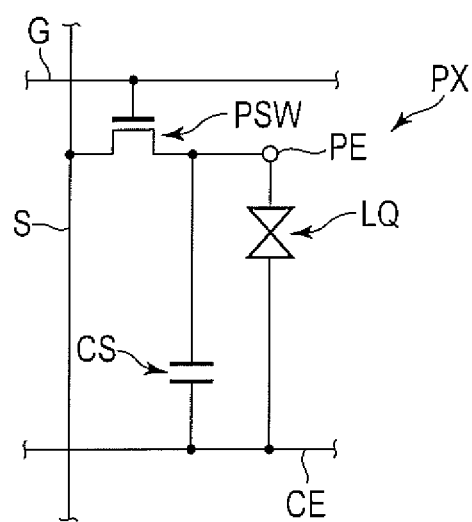
F I G. 3

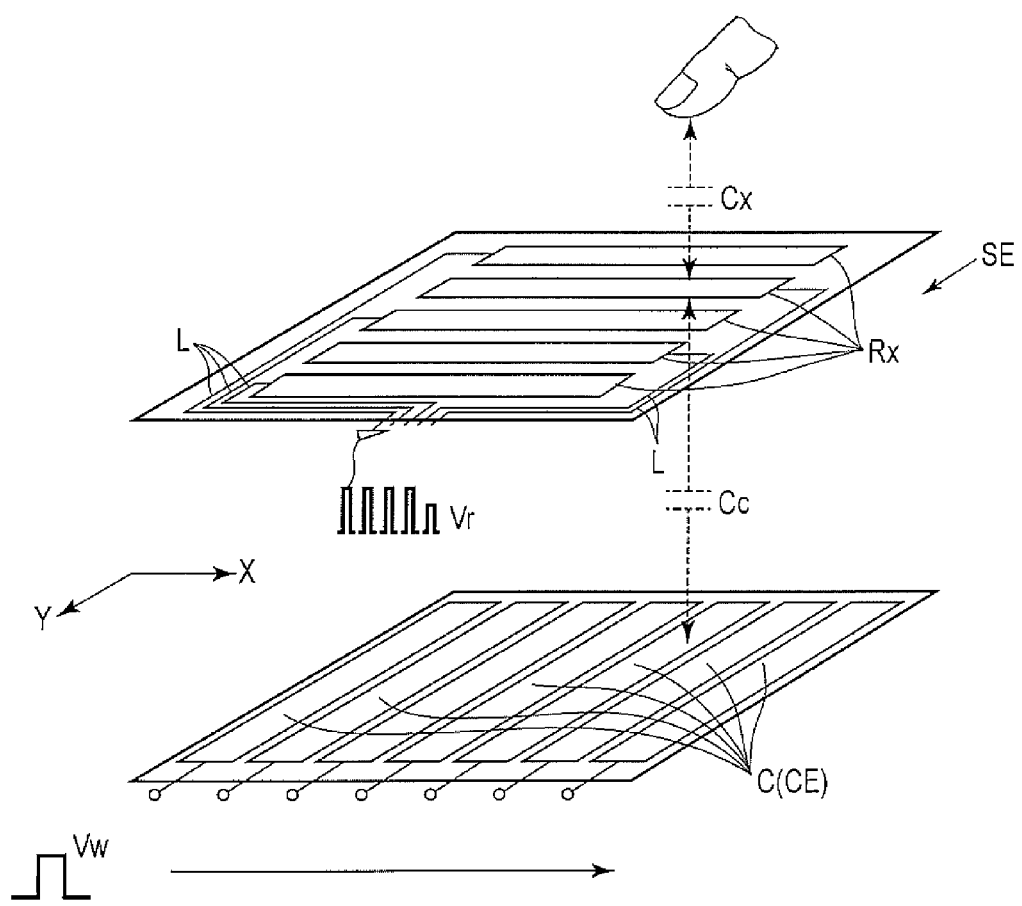
F I G. 8

| W1 | W3 | W3/W1 | Touch signal | Degree of line noise |
|---|---|---|---|---|
| 4200 | 3000 | 0.71 | 20 | 0 |
| 4200 | 2550 | 0.61 | 55 | 0 |
| 4200 | 2325 | 0.55 | 80 | 0 |
| 4200 | 2175 | 0.52 | 85 | 0 |
| 4200 | 1950 | 0.46 | 94 | 0 |
| 4200 | 1875 | 0.45 | 90 | 0 |
| 4200 | 1725 | 0.41 | 93 | 0 |
| 4200 | 1500 | 0.36 | 98 | 0 |
| 4200 | 1125 | 0.27 | 101 | 0 |
| 4200 | 750 | 0.18 | 100 | 0 |
| 4200 | 525 | 0.13 | 97 | 2 |
| 4200 | 225 | 0.05 | 105 | 2.3 |
| 4200 | 0 | 0 | 100 | 10 |
|  |  |  |  |  |
| 2325 | 1500 | 0.65 | 55 | 0 |
| 2325 | 1425 | 0.61 | 72 | 0 |
| 2325 | 1200 | 0.52 | 90 | 0 |
| 2325 | 1125 | 0.48 | 92 | 0 |
| 2325 | 975 | 0.42 | 95 | 0 |
| 2325 | 750 | 0.32 | 99 | 0.5 |
| 2325 | 525 | 0.23 | 99 | 1.5 |
| 2325 | 300 | 0.13 | 100 | 3 |
| 2325 | 0 | 0 | 100 | 10 |

FIG. 9

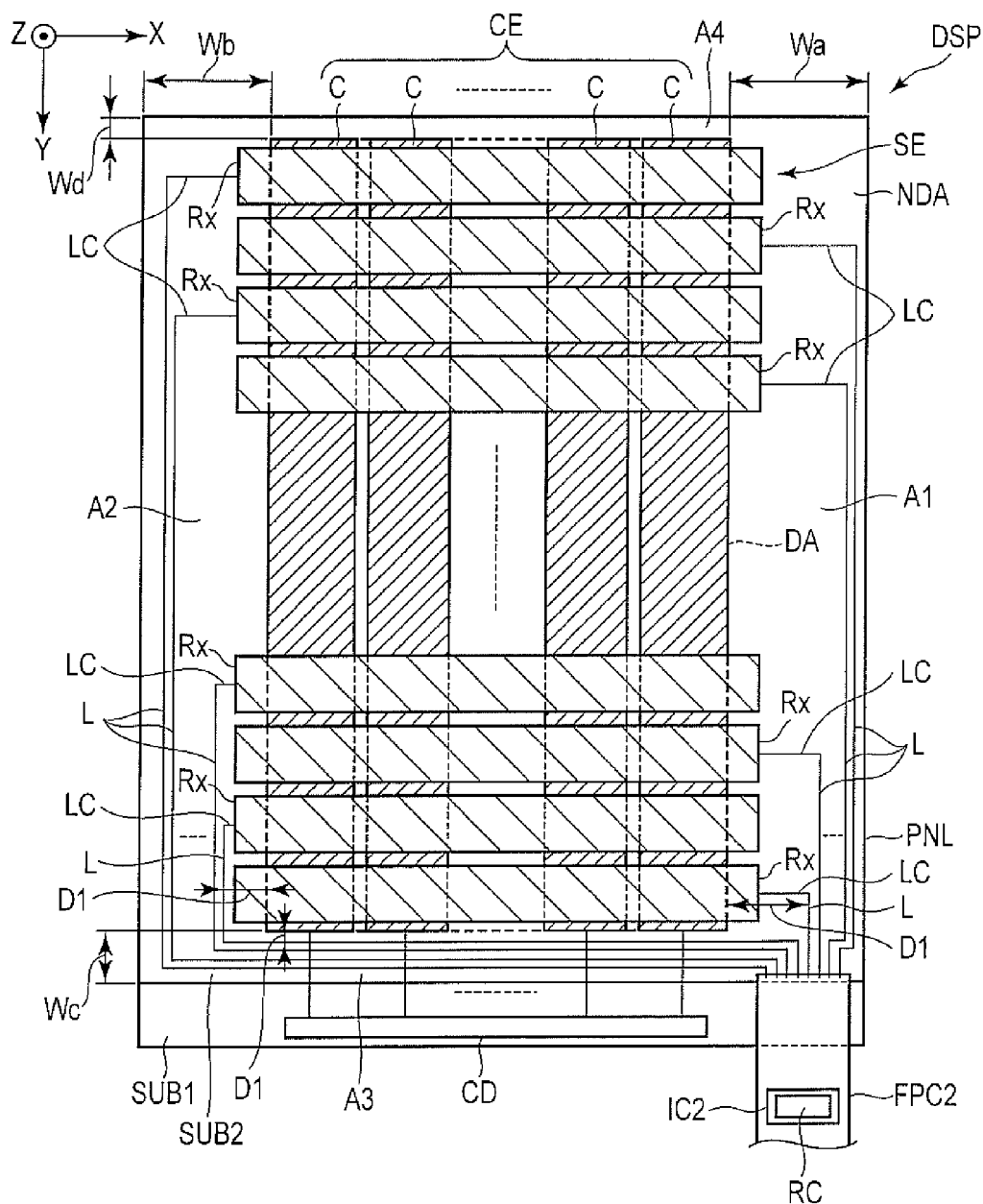
F I G. 11

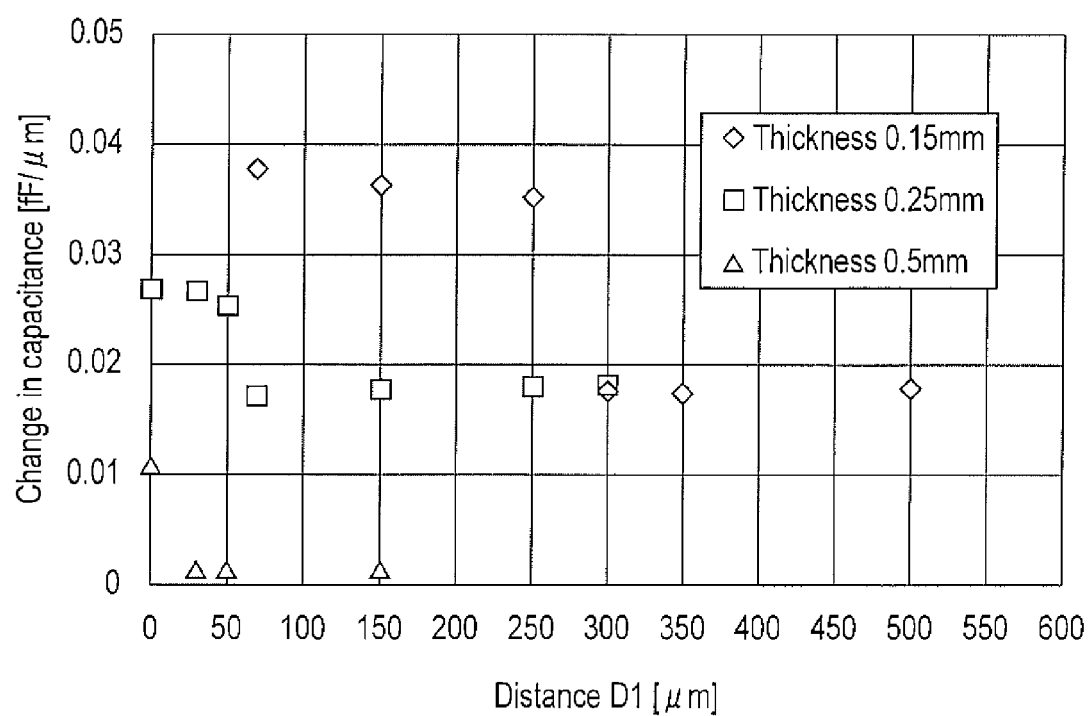
F I G. 14

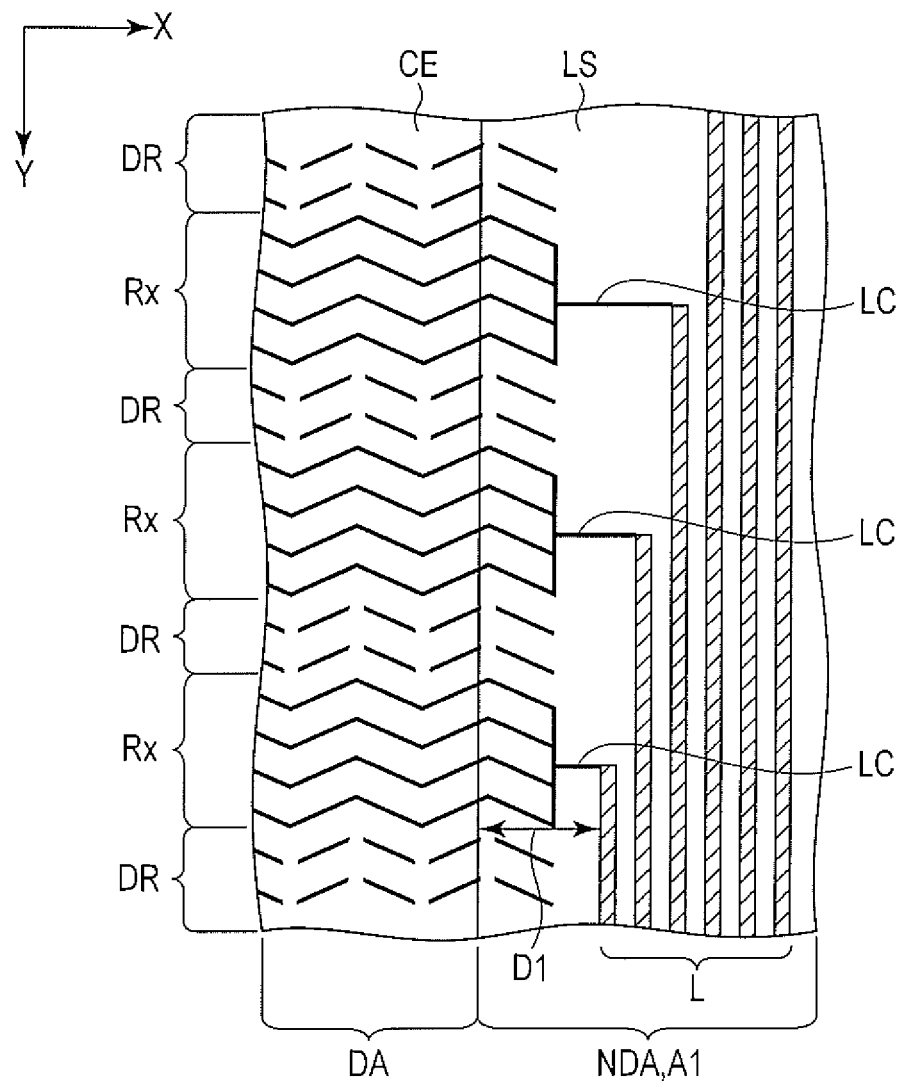
F I G. 15

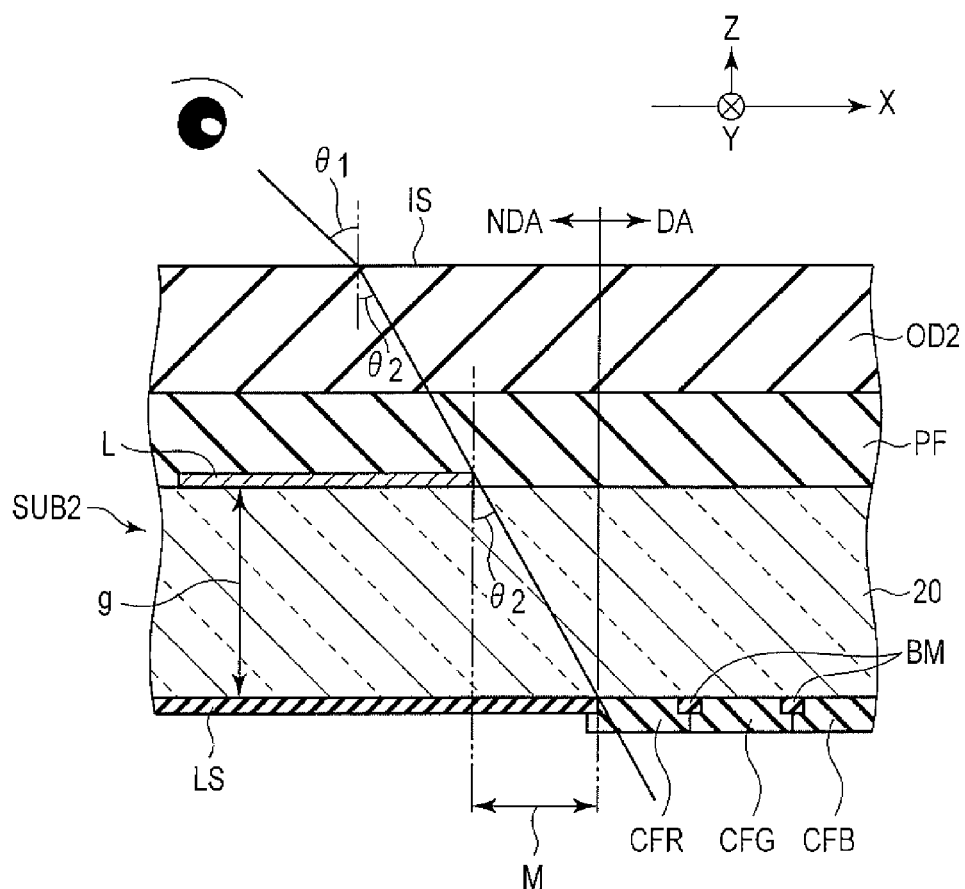
F I G. 20

| Second distance g | First distance M | M/g | Result |
|---|---|---|---|
| 150 μm | 0 μm | 0 | Lv.3 |
| | 30 μm | 0.2 | Lv.3 |
| | 60 μm | 0.4 | Lv.2 |
| | 90 μm | 0.6 | Lv.1 |
| | 120 μm | 0.8 | Lv.1 |
| 200 μm | 0 μm | 0 | Lv.3 |
| | 30 μm | 0.15 | Lv.3 |
| | 60 μm | 0.3 | Lv.3 |
| | 90 μm | 0.5 | Lv.1 |
| | 120 μm | 0.6 | Lv.1 |
| 300 μm | 0 μm | 0 | Lv.3 |
| | 30 μm | 0.1 | Lv.3 |
| | 60 μm | 0.2 | Lv.3 |
| | 90 μm | 0.3 | Lv.3 |
| | 120 μm | 0.4 | Lv.2 |

| | Y | x | y | L* | a* | b* | ΔEab1 | ΔEab2 |
|---|---|---|---|---|---|---|---|---|
| Comparative example 1 | 2.1 | 0.192 | 0.119 | 16.00 | 24.03 | -110.04 | 113.68 | 64.59 |
| Comparative example 2 | 3.26 | 0.162 | 0.153 | 21.06 | 3.04 | -103.32 | 103.96 | 57.97 |
| Comparative example 3 | 3.1 | 0.205 | 0.151 | 20.44 | 16.87 | -97.77 | 99.85 | 56.18 |
| Comparative example 4 | 3.17 | 0.162 | 0.159 | 20.71 | 0.99 | -98.25 | 98.93 | 55.58 |
| Comparative example 5 | 2.81 | 0.201 | 0.154 | 19.27 | 14.15 | -93.23 | 95.11 | 54.22 |
| Comparative example 6 | 2.05 | 0.214 | 0.140 | 15.75 | 20.90 | -90.90 | 94.56 | 55.23 |
| Example 1 | 2.56 | 0.196 | 0.160 | 18.17 | 10.23 | -86.67 | 88.30 | 46.88 |
| Example 2 | 2.90 | 0.218 | 0.186 | 19.64 | 8.34 | -72.94 | 74.38 | 38.98 |
| Example 3 | 2.92 | 0.235 | 0.203 | 19.73 | 7.74 | -62.09 | 63.66 | 33.06 |
| Example 4 | 3.51 | 0.238 | 0.216 | 22.00 | 5.33 | -59.12 | 60.13 | 30.74 |
| Example 5 | 2.82 | 0.248 | 0.221 | 19.30 | 5.95 | -51.78 | 53.49 | 27.52 |
| Example 6 | 3.73 | 0.254 | 0.237 | 22.77 | 3.92 | -48.49 | 49.43 | 24.72 |
| Example 7 | 4.58 | 0.267 | 0.257 | 25.50 | 2.34 | -41.03 | 41.58 | 19.95 |
| Example 8 | 2.91 | 0.289 | 0.258 | 19.68 | 6.01 | -31.81 | 34.32 | 17.04 |
| Example 9 | 3.86 | 0.290 | 0.271 | 23.21 | 3.94 | -29.49 | 30.81 | 14.47 |
| Example 10 | 3.82 | 0.307 | 0.294 | 23.08 | 2.56 | -18.16 | 19.99 | 8.73 |
| Example 11 | 2.72 | 0.339 | 0.296 | 18.87 | 6.93 | -10.71 | 17.42 | 8.89 |
| Example 12 | 4.55 | 0.314 | 0.307 | 25.43 | 1.32 | -12.86 | 14.11 | 5.20 |
| Example 13 | 4.34 | 0.333 | 0.320 | 24.75 | 2.42 | -4.69 | 8.01 | 3.77 |
| Example 14 | 4.54 | 0.330 | 0.322 | 25.39 | 1.50 | -4.65 | 7.31 | 3.26 |
| Example 15 | 4.65 | 0.335 | 0.331 | 25.70 | 0.69 | -0.57 | 5.13 | 4.04 |
| Example 16 | 5.44 | 0.331 | 0.335 | 27.94 | -0.77 | 0.28 | 3.03 | 3.92 |

SENSOR-EQUIPPED DISPLAY DEVICE

CROSS REFERENCES TO RELATED APPLICATIONS

The present application claims priority to Japanese Priority Patent Application JP2014-054472 filed in the Japan Patent Office on Mar. 18, 2014, and JP2014-058134 filed in the Japan Patent Office on Mar. 20, 2014 the entire content of which is hereby incorporated by reference.

BACKGROUND

Embodiments described herein relate generally to a sensor-equipped display device.

SUMMARY

In recent years, touchscreen display devices, which include sensors to detect the contact or approach of an object, have come to be used in commercially available products. As an example of such sensors, there is a capacitive sensor which detects contact or the like of an object based on a change in capacitance. In such a sensor, detection electrodes and sensor driving electrodes are used as components and are disposed within a display area, in which images are displayed, while being opposed to each other with dielectrics interposed therebetween. The detection electrodes are electrically connected to lead lines positioned outside the display area.

There is a strong demand for a miniaturized display device having an enlarged display area; thus the outer rim of the display area, that is, the frame, needs to be designed to be small. Therefore, the sensor driving electrodes and the lead lines are disposed in close proximity. In this case, capacitive coupling occurs between the sensor driving electrodes and the lead lines and causes the lead lines to function as sensors. For example, if an object contacts or comes close to the outermost rim of the display area, a change in capacitance in the lead lines is detected. That is, even if an object is in proximity to different detection electrodes, the detection electrodes connected to these lead lines erroneously function as if they detect the object.

To solve this problem, there is a proposed technique to provide a grounded conductive material outside the display area between sensor driving electrodes and peripheral lines (lead lines) to eliminate capacitive coupling between the sensor driving electrodes and the peripheral lines.

Additional features and advantages are described herein, and will be apparent from the following Detailed Description and the figures.

BRIEF DESCRIPTION OF THE FIGURES

FIG. 2 shows a basic structure and an equivalent circuit of the liquid crystal display device of FIG. 1.

FIG. 3 is an equivalent circuit of a pixel shown in FIG. 2.

FIG. 8 illustrates a principle of a sensing method for instance.

FIG. 9 is a view which shows experimental results of an experiment conducted to measure line noise and touch signal.

FIG. 11 is a plan view which schematically shows the structure of a sensor of a sensor-equipped display device of a second embodiment.

FIG. 14 is a graph which shows a change in capacitance between a common electrode and a lead line measured by changing a thickness of a second insulating substrate of the second embodiment with respect to a distance from an edge of the common electrode to the lead line in plane view.

FIG. 15 is a plan view which schematically shows a variation 1 of the sensor of the liquid crystal display device of the second embodiment in a partly enlarged fashion.

FIG. 20 is a cross-sectional view which schematically shows the structure of a sensor-equipped liquid crystal display device of a fourth embodiment in part.

FIG. 21 is a table which shows M/g values and determination results obtained when first distance and second distance are changed in the sensor-equipped liquid crystal display device of the fourth embodiment.

FIG. 24 is a table which shows (1) the color of light reflected by lead lines L based on the xyY color system, (2) the color of light reflected by lead lines L based on the L*a*b* color system, (3) color difference between light reflected by lead lines L and light reflected by peripheral light shielding layer LS without polarizer, and (4) color difference between light reflected by lead lines L and light reflected by peripheral light shielding layer LS with polarizer (second optical element OD2), regarding examples 1 to 16 of a sensor-equipped liquid crystal display device of a fifth embodiment and comparative examples 1 to 6.

DETAILED DESCRIPTION

In general, according to one embodiment, there is provided a sensor-equipped display device comprising: a display panel comprising a common electrode and a pixel electrode disposed within a display area to display an image, a detection electrode opposed to the common electrode, a connection line connected to the detection electrode, and a lead line provided within a non-display area outside the display area and electrically connected to the detection electrode via the connection line; a first driver which supplies a common driving signal to the common electrode during a display drive time in which an image is displayed using the pixel electrode and supplies a sensor driving signal to the common electrode during a sensing drive time in which sensing is performed using the detection electrode; and a second driver which is connected to the lead line and detects a sensor output value of the detection electrode output from the lead line during the sensing drive time, wherein the lead line and the common electrode are apart from each other with a certain gap at least during the sensing drive time.

Hereinafter, embodiments of the present application will be explained with reference to accompanying drawings. Note that the disclosure is presented for the sake of exemplification, and any modification and variation conceived within the scope and spirit of the invention by a person having ordinary skill in the art are naturally encompassed in the scope of invention of the present application. Furthermore, a width, thickness, shape, and the like of each element are depicted schematically in the Figures as compared to actual embodiments for the sake of simpler explanation, and they are not to limit the interpretation of the invention of the present application. Furthermore, in the description and Figures of the present application, structural elements having the same or similar functions will be referred to by the same reference numbers and detailed explanations of them that are considered redundant may be omitted.

First Embodiment

A sensor-equipped display device of the first embodiment will be explained.

Figure 1:
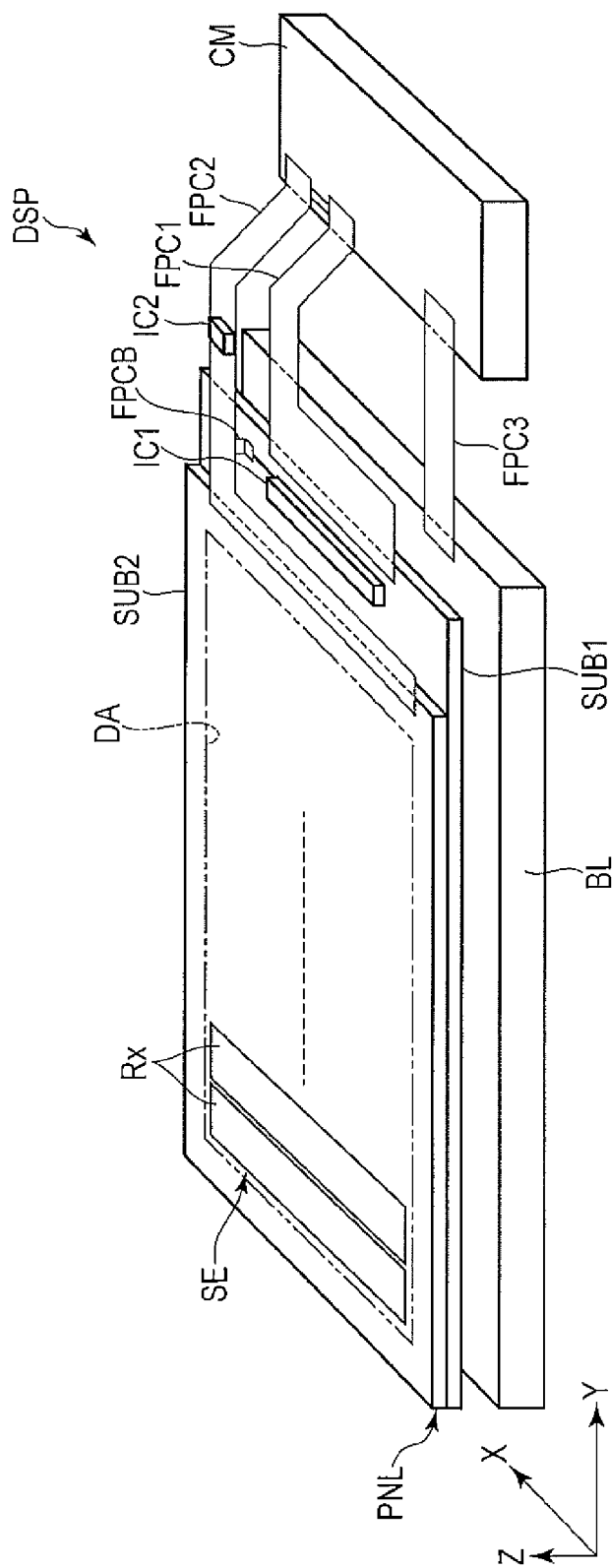
FIG. 1 is a perspective view which schematically shows the structure of the sensor-equipped display device of a first embodiment.

FIG. 1 is a perspective view which schematically shows the structure of a sensor-equipped display device of an embodiment. In this embodiment, the display device is a liquid crystal display device. However, no limitation is intended thereby, and the display device may be any type of flat panel display devices including self-luminous display devices such as an organic electroluminescent display device and the like, and electronic paper display devices including electrophoretic elements and the like.

The liquid crystal display device DSP includes an active matrix type liquid crystal display panel PNL, driver IC chip IC1 which drives the liquid crystal display panel PNL, capacitive sensor SE, driver IC chip IC2 which drives the sensor SE, backlight unit BL which illuminates the liquid crystal panel PNL, control module CM, and flexible printed circuits FPC1, FPC2, and FPC3.

The liquid crystal display panel PNL includes a flat-panel first substrate SUB1, flat-panel second substrate SUB2 arranged opposite to the first substrate SUB1 with a predetermined gap, and liquid crystal layer (liquid crystal layer LQ which is described later) held between the first substrate SUB1 and the second substrate SUB2. In the present embodiment, the first substrate SUB1 may be reworded into an array substrate and the second substrate SUB2 may be reworded into a counter-substrate. The liquid crystal display panel PNL includes a display area (active area) DA which displays images. The liquid crystal display panel PNL is a transmissive type display panel having a transmissive display function which displays images by selectively transmitting the light from the backlight unit BL. Note that the liquid crystal display panel PNL may be a reflective type liquid crystal display panel having a reflective display function which displays images by selectively reflecting light from the display surface side such as external light and auxiliary light. Alternatively, the liquid crystal display panel PNL may be a transflective type liquid crystal display panel including both transmissive and reflective display functions.

The backlight unit BL is disposed at the rear surface side of the first substrate SUB1. As a backlight unit BL, various models can be adopted. As a light source of the backlight unit BL, various models can be adopted including light emitting diode (LED) or cold cathode tube (CCFL). Detailed explanation thereof is omitted. Note that, if the liquid crystal display panel PNL is of reflective type having the reflective display function alone, the backlight unit BL can be excluded.

The sensor SE includes a plurality of detection electrodes Rx. The detection electrodes Rx are disposed on, for example, the display surface of the liquid crystal display panel PNL. In the example depicted, the detection electrodes Rx are extended substantially in first direction X and aligned in second direction Y. Note that the detection electrodes Rx may be extended in second direction Y and aligned in first direction X, or may be formed in an island shape to be arranged in a matrix in first direction X and second direction Y. In the example depicted, first direction X and second direction Y are orthogonal to each other; however, they may cross each other at any degrees other than 90°. Third direction Z is orthogonal to first direction X and second direction Y, respectively.

Driver IC chip IC1 is mounted on the first substrate SUB1 of the liquid crystal display panel PNL. Flexible printed circuit FPC1 connects the liquid crystal display panel PNL with the control module CM. Flexible printed circuit FPC2 connects the detection electrodes Rx of the sensor SE with the control module CM. Driver IC chip IC2 is mounted on flexible printed circuit FPC2. Flexible printed circuit FPC3 connects the backlight unit BL with the control module CM. Here, the control module CM may be reworded into an application processor.

Driver IC chips IC1 and IC2 are connected to each other via flexible printed circuit FPC2 and the like. For example, if flexible printed circuit FPC2 includes a branch FPCB connected to the first substrate SUB1, driver IC chips IC1 and IC2 may be connected to each other via a line included in the branch FPCB and a line on the first substrate SUB1. Furthermore, driver IC chips IC1 and IC2 may be connected to each other via lines included in flexible printed circuit FPC1 and flexible printed circuit FPC2, respectively.

One of driver IC chips IC1 and IC2 produces a timing signal which informs a driving period of the sensor SE and supplies the timing signal to the other driver IC chip. Alternatively, one of driver IC chips IC1 and IC2 produces a timing signal which informs a driving period of a common electrode CE and supplies the timing signal to the other driver IC chip. Alternatively, the control module CM supplies the timing signal to both driver IC chips IC1 and IC2. The timing signal can be used for driving both driver IC chips IC1 and IC2 in synchronization.

FIG. 2 is a view which schematically shows the basic structure and equivalent circuit of the liquid crystal display device DSP shown in FIG. 1.

In addition to the liquid crystal display panel PNL, the liquid crystal display device DSP includes a source line driving circuit SD, gate line driving circuit GD, common electrode driving circuit CD within a non-display area NDA which is outside the display area DA. The source line driving circuit SD and the common electrode driving circuit CD are at least partially stored in driver IC chip IC1. Note that the non-display area NDA is in a frame shape surrounding the display area DA.

The liquid crystal display panel PNL includes a plurality of pixels PX in the display area DA. The pixels PX are in an m×n matrix in first direction X and second direction Y (where m and n are positive integers). Furthermore, the liquid crystal display panel PNL includes n gate lines G (G1 to Gn), m source lines S (S1 to Sm), and common electrode CE within the display area DA.

The gate lines G are extended substantially linearly in direction X to be drawn outside the display area DA and connected to the gate line driving circuit GD. Furthermore, the gate lines G are arranged in second direction Y at intervals. The source lines S are extended substantially linearly in second direction Y to be drawn outside the display area DA and connected to the source line driving circuit SD. Furthermore, the source lines S cross the gate lines G, and are arranged in direction X at intervals. The gate lines G and the source lines S are not necessarily extended linearly and may be extended partly being bent. The common electrode CE is drawn outside the display area DA to be connected with the common electrode driving circuit CD. The common electrode CE is shared with pixels PX. The common electrode CE is described later in detail.

FIG. 3 is a view which shows an equivalent circuit of the pixel PX shown in FIG. 2.

Each pixel PX includes a pixel switching element PSW, pixel electrode PE, common electrode CE, and liquid crystal layer LQ. The pixel switching element PSW consists of, for example, a thin-film transistor. The pixel switching element PSW is electrically connected to the gate line G and the source line S. The pixel switching element PSW is of either top gate type or bottom gate type. The semiconductor layer of the pixel switching element PSW is formed of polysilicon; however, it may be formed of amorphous silicon, oxide semiconductor, or the like. The pixel electrode PE is electrically connected to the pixel switching element PSW. The pixel electrode PE is opposed to the common electrode CE. The common electrode CE, insulating film, and the pixel electrode PE form a storage capacitance CS.

Figure 4:
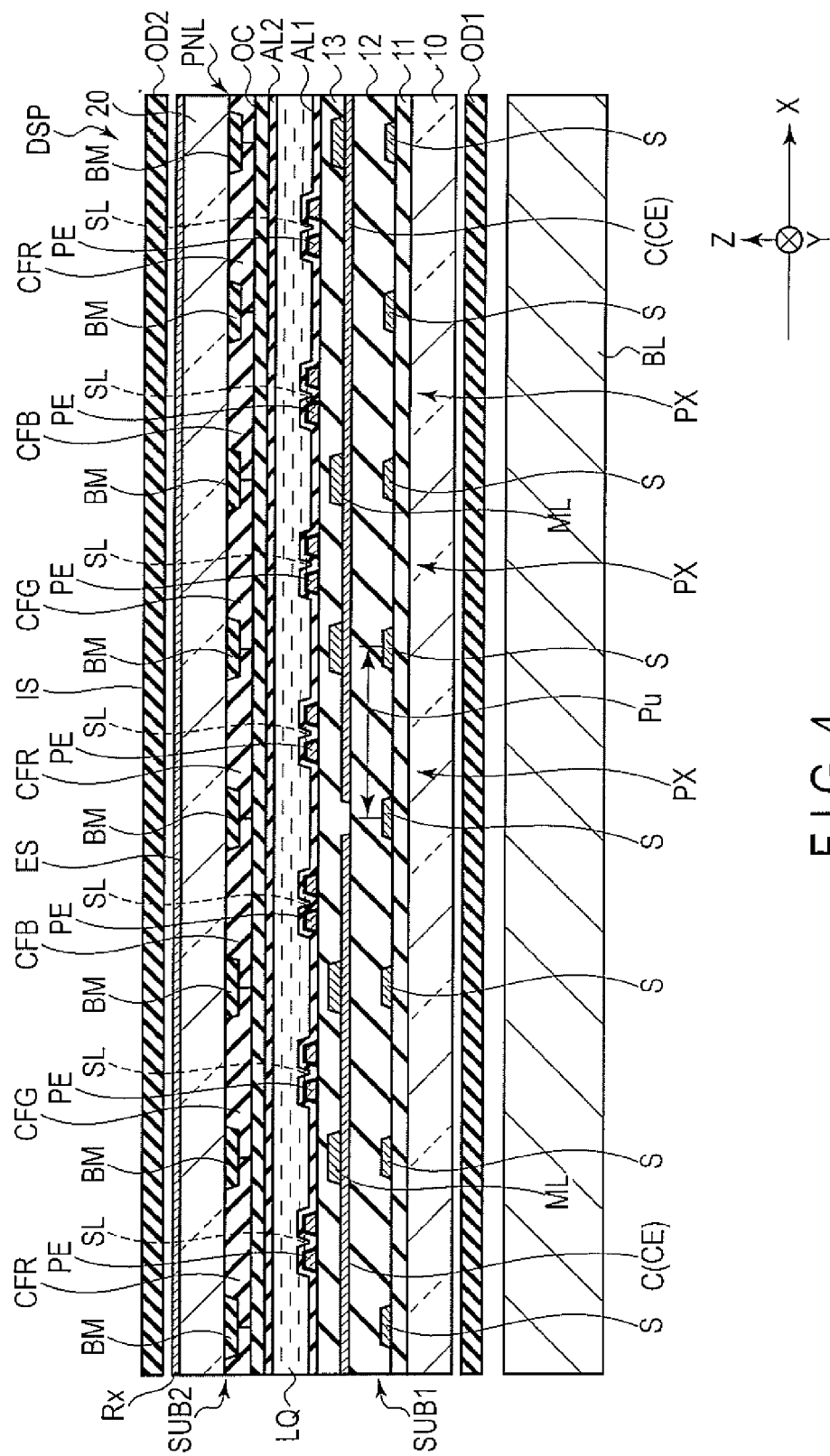
FIG. 4 is a cross-sectional view which schematically shows the structure of the liquid crystal display device in part.

FIG. 4 is a cross-sectional view which schematically shows the structure of the liquid crystal display device DSP in part.

The liquid crystal display device DSP includes a first optical element OD1 and a second optical element OD2 in addition to the above-described liquid crystal display panel PNL and backlight unit BL. The liquid crystal display panel PNL depicted in the Figure has a structure corresponding to a fringe field switching (FFS) mode as its display mode; however, no limitation is intended thereby, and the liquid crystal display panel PNL may have a structure which corresponds to another display mode. For example, the liquid crystal display panel PNL may have a structure corresponding to an in-plane switching (IPS) mode mainly using a transverse field which is substantially parallel to a substrate main surface such as the FFS mode. In the display mode using such a transverse field, a structure including both pixel electrodes PE and common electrode CE disposed on the first substrate SUB1 can be adopted, for example. Alternatively, the liquid crystal display panel PNL may have a structure corresponding to a mode mainly using a vertical field which is orthogonal to the substrate main surface such as a twisted nematic (TN) mode, optically compensated bend (OCB) mode, and vertical aligned (VA) mode. In the display mode using such a vertical field, a structure including pixel electrodes PE on the first substrate SUB1 and a common electrode CE on the second substrate SUB2, or a reverse structure can be adopted. Note that the substrate main surface is a surface which is parallel to an X-Y plane defined by first direction X and second direction Y orthogonal to each other.

The liquid crystal display panel PNL includes the first substrate SUB1, second substrate SUB2, and liquid crystal layer LQ. The first substrate SUB1 and the second substrate SUB2 are bonded to each other with a predetermined cell gap formed therebetween. The liquid crystal layer LQ is held in the cell gap between the first substrate SUB1 and the second substrate SUB2.

The first substrate SUB1 is formed based on a transmissive first insulating substrate 10 such as a glass substrate or a resin substrate. The first substrate SUB1 includes gate lines, pixel switching elements, source lines S, common electrode CE, pixel electrode PE, first insulating film 11, second insulating film 12, third insulating film 13, and first alignment film AL1 on the surface of the first insulating substrate 10 at the side opposed to the second substrate SUB2.

The first insulating film 11 is disposed on the first insulating substrate 10. Although this is not described in detail, a top gate type pixel switching element is adopted in the present embodiment for instance. In this embodiment, the first insulating film 11 includes a plurality of insulating layers layered in third direction Z. For example, the first insulating film 11 includes various insulating layers such as undercoat layer interposed between the first insulating substrate 10 and the semiconductor layer of the pixel switching element, gate insulating layer interposed between the semiconductor layer and the gate electrode, and interlayer insulating layer interposed between a gate electrode and a plurality of electrodes including source electrode and drain electrode. The gate lines are disposed between the gate insulating layer and the interlayer insulating layer as with the gate electrode. The source lines S are formed on the first insulating film 11. Furthermore, source electrode and drain electrode of the switching element PSW are formed on the first insulating film 11. In the example depicted, the source lines S are extended in second direction Y.

The second insulating film 12 is disposed on the source lines S and the first insulating film 11. The common electrode CE is formed on the second insulating film 12. The common electrode CE includes a plurality of divisional electrodes C. The common electrode CE consists of a transparent conductive material such as indium tin oxide (ITO) and indium zinc oxide (IZO). In the example depicted, a metal layer ML is formed on the common electrode CE to lower the resistance of the common electrode CE; however, the metal layer ML may be omitted.

The third insulating film 13 is disposed on the common electrodes CE and the second insulating film 12. The pixel electrodes PE are formed on the third insulating film 13. Each pixel electrode PE is disposed between adjacent source lines S to be opposed to the common electrode CE. Furthermore, each pixel electrode includes a slit SL at a position to be opposed to the common electrode CE. The pixel electrode PE consists of a transparent conductive material such as ITO or IZO. The first alignment film AL1 covers the pixel electrodes PE and the third insulating film 13.

On the other hand, the second substrate SUB2 is formed based on a transmissive second insulating substrate 20 such as a glass substrate or a resin substrate. The second substrate SUB2 includes black matrix BM, color filters CFR, CFG and CFB, overcoat layer OC, and second alignment film AL2 on the surface of the second insulating substrate 20 at the side opposed to the first substrate SUB1.

The black matrix BM is formed on an inner surface of the second insulating substrate 20 and partitions the respective pixels. Each of the color filters CFR, CFG, and CFB is formed on the inner surface of the second insulating substrate 20 and partly overlaps the black matrix BM. Color filter CFR is a red filter disposed to correspond to a red pixel and formed of a red resin material. Color filter CFG is a green filter disposed to correspond to a green pixel and formed of a green resin material. Color filter CFB is a blue filter disposed to correspond to a blue pixel and formed of a blue resin material. In the example depicted, a unit pixel which is the minimum unit of a color image is composed of three color pixels of red, green, and blue. However, a unit pixel PX is not limited to a combination of the above-mentioned three color pixels. For example, a unit pixel may be composed of four color pixels including a white pixel in addition to the red, blue, and green pixels. In that case, a white or transparent filter may be disposed to correspond to the white pixel, or a color filter corresponding to the white color pixel may be omitted. The overcoat layer OC covers color filters CFR, CFG, and CFB. The overcoat layer OC consists of a transparent resin material. The second alignment film AL2 covers the overcoat layer OC.

The detection electrode Rx is formed on the outer surface ES of the second insulating substrate 20. In the example depicted, the detection electrode Rx contacts the outer surface ES of the second insulating substrate 20; however, it may be apart from the outer surface ES. In such a structure that the detection electrode Rx is apart from the outer surface ES, an insulating member is interposed between the outer surface ES and the detection electrode Rx. The detailed structure of the detection electrode Rx is described later. Furthermore, for the sake of simpler depiction, the lead lines L described later are omitted from the Figure. The detection electrode Rx consists of a metal such as aluminum. By reducing electrical resistance of the detection electrode Rx, the time required for the detection can be shortened. Thus, using a metal detection electrode Rx is advantageous for achieving a larger liquid crystal display panel PNL with higher definition. Note that the detection electrode Rx may be formed of a transparent conductive material such as ITO or IZO, or may be a combination (an assembly) of a metal (for example, a fine metallic line) and a transparent conductive material (for example, a stripe-like conductive layer). Each detection electrode Rx is opposed to the common electrode CE with dielectrics such as third insulating film 13, first alignment film AL1, liquid crystal layer LQ, second alignment film AL2, overcoat layer OC, color filters CFR, CFG, CFB, second insulating substrate 20 interposed therebetween.

The first optical element OD1 is interposed between the first insulating substrate 10 and the backlight unit BL. The second optical element OD2 is disposed above the detection electrode Rx. Each of the first optical element OD1 and the second optical element OD2 includes at least a polarizer and may include a retardation film if necessary. The polarizer of the first optical element OD1 and the polarizer of the second optical element OD2 are arranged in crossed-Nicols such that their absorption axes are orthogonal to each other. Furthermore, in the example depicted, the input surface IS of the liquid crystal display device DSP is the surface of the second optical element OD2. The liquid crystal display device DSP can acquire positional data of a position of the input surface IS where a conductive object such as a finger contacts or approaches.

Now, the capacitive sensor SE mounted on the liquid crystal display device DSP of the present embodiment is explained.

Figure 5:
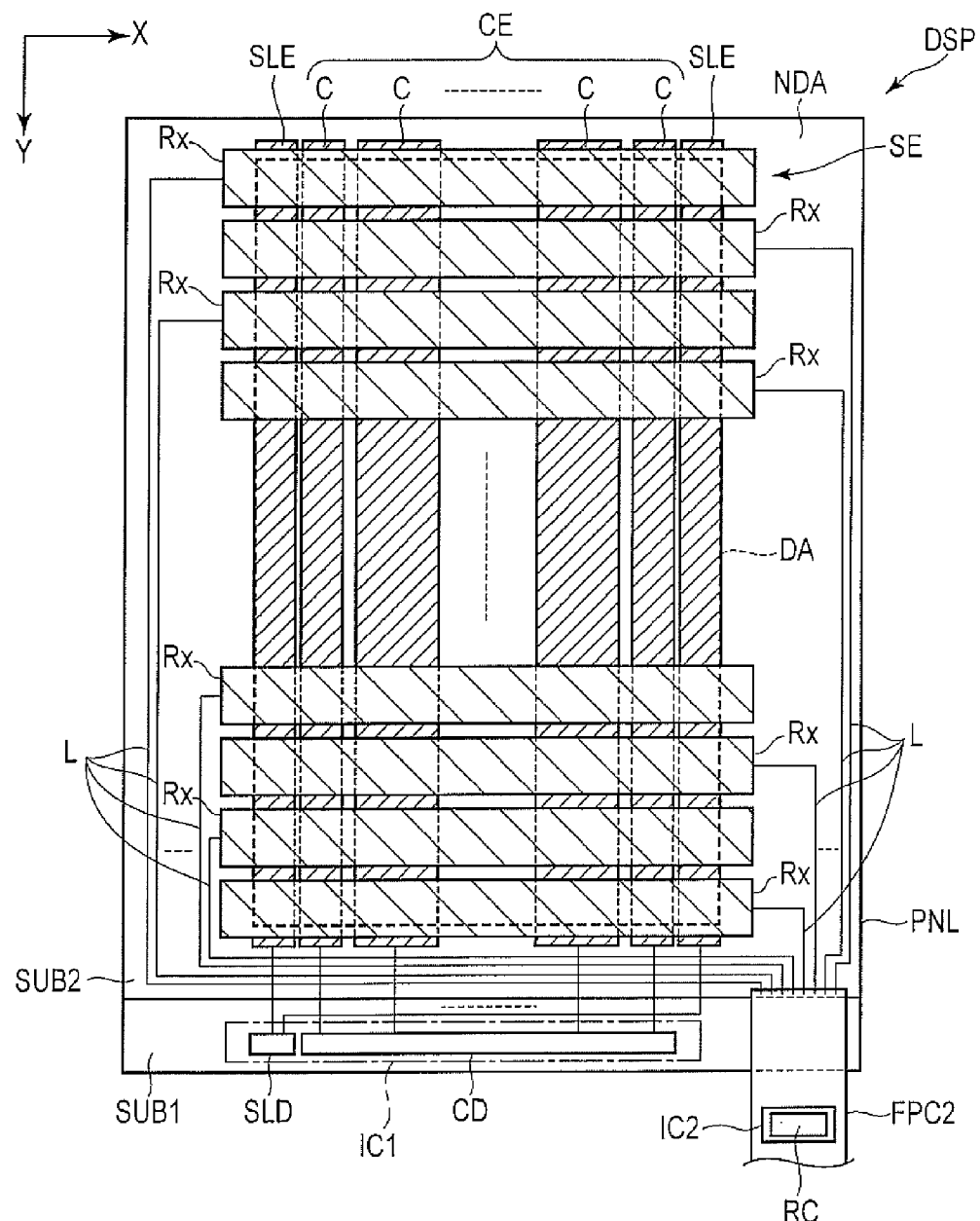
FIG. 5 is a plan view which schematically shows the structure of the sensor of the first embodiment.

FIG. 5 is a plan view which schematically shows a structural example of the sensor SE of the present embodiment. In the example depicted, the sensor SE comprises the common electrode CE of the first substrate SUB1 and the detection electrodes Rx of the second substrate SUB2. That is, the common electrode CE functions as an electrode for display and also as an electrode for sensor driving.

That is, the liquid crystal display panel PNL includes shield electrodes SLE and lead lines L in addition to the above-described common electrode CE and detection electrodes Rx. The common electrode CE and detection electrodes Rx are arranged within the display area DA. In the example depicted, the common electrode CE includes a plurality of stripe-like divisional electrodes C arranged at intervals in first direction X and extended substantially linearly in second direction Y. The detection electrodes Rx are arranged at intervals in second direction Y and extended substantially linearly in first direction X within the display area DA. That is, the detection electrodes Rx are extended to cross the divisional electrodes C. The common electrode CE and the detection electrodes Rx are opposed to each other with various dielectrics interposed therebetween as described above.

The number, size, and shape of the divisional electrodes C are not limited specifically and can be changed arbitrarily. Furthermore, as in the example described later, common electrodes CE may be arranged at intervals in second direction Y and extended substantially linearly in first direction X. Moreover, the common electrode CE is not necessarily divided and may be a single plate electrode formed continuously within the display area DA.

The shield electrodes SLE are disposed at an end of the display area DA. In the example depicted, the shield electrodes SLE are disposed at both ends of the display area DA in first direction X (that is, right end and left end of the display area DA). The shield electrodes SLE are extended substantially linearly in second direction Y and arranged with the divisional electrodes C with a gap therebetween. The shield electrodes SLE are disposed on the first substrate SUB1. For example, shield electrodes SLE and the common electrode CE are disposed on same layer.

Lead lines L are disposed on the second substrate SUB2 within the non-display area NDA and are electrically connected to the detection electrodes Rx one to one. Each of the lead lines L outputs a sensor output value from its corresponding detection electrode Rx. In the example depicted, the lead lines L are disposed at both sides of the non-display area NDA to hold the display area DA therebetween. For example, amongst the detection electrodes Rx arranged in second direction Y, the odd-numbered detection electrodes Rx are connected to the lead lines L which are disposed within the non-display area NDA at the left side of the Figure, and the even-numbered detection electrodes Rx are connected to the lead lines L which are disposed within the non-display area NDA at the right side of the Figure. Such a layout of the lead lines L conforms to such demands that the width of the both sides of the non-display area NDA be uniformed and that the frame of the display be narrowed. The lead lines L are, for example, disposed on the second substrate SUB2 as with the detection electrodes Rx.

Note that the layout of the lead lines L may be changed such that, amongst the detection electrodes Rx arranged on the display area in second direction Y, the upper half of the detection electrodes Rx are connected to the lead lines L which are disposed at one end of the non-display area NDA and the lower half of the detection electrodes Rx are connected to the lead lines L which are disposed at the other end of the non-display area NDA.

The liquid crystal display device DSP includes a common electrode driving circuit (first driver) CD and a shield electrode driving circuit (third driver) SLD arranged on the non-display area NDA. In the example depicted, the common electrode driving circuit CD and the shield electrode driving circuit SLD are at least partly accommodated in driver IC chip IC1; however, no limitation is intended thereby. Either the common electrode driving circuit CD or the shield electrode driving circuit SLD may be accommodated in driver IC chip IC1. Alternatively, both the common electrode driving circuit CD and the shield electrode driving circuit SLD may be provided outside driver IC chip IC1. Each of the divisional electrodes C is electrically connected to the common electrode driving circuit CD. Each of the shield electrodes SLE is electrically connected to the shield electrode driving circuit SLD. The common electrode driving circuit CD supplies a common driving signal to the common electrode CE at a display drive time which is a time to display images and supplies a sensor driving signal to the common electrode CE at a sensing drive time which is a time to perform sensing. The shield electrode driving circuit SLD supplies a common driving signal to the shield electrode SLE at the display drive time and maintains the shield electrode SLE to have a potential different from that of the sensor driving signal at the sensing drive time. For example, the shield electrode driving circuit SLD maintains the shield electrode SLE to the ground potential at the sensing drive time. Otherwise, the shield electrode driving circuit SLD switches the shield electrode SLE to the electrically floating state at the sensing drive time. Otherwise, the shield electrode driving circuit SLD supplies a common driving signal to the shield electrode SLE at the sensing drive time. Note that, other than the above examples, the shield electrode driving circuit SLD may be driven to set the shield electrode SLE to a desired potential at the sensing drive time.

Flexible printed circuit FPC2 is connected to second substrate SUB2 and is electrically connected to each of the lead lines L. A detection circuit RC is accommodated in, for example, driver IC chip IC2 (second driver). The detection circuit RC detects a contact or approach of an object to the liquid crystal display device DSP based on sensor output values from the detection electrodes Rx. Furthermore, the detection circuit RC can detect positional data of a point where an object contacts or approaches. Note that the detection circuit RC may be accommodated in the control module CM instead.

Figure 6:
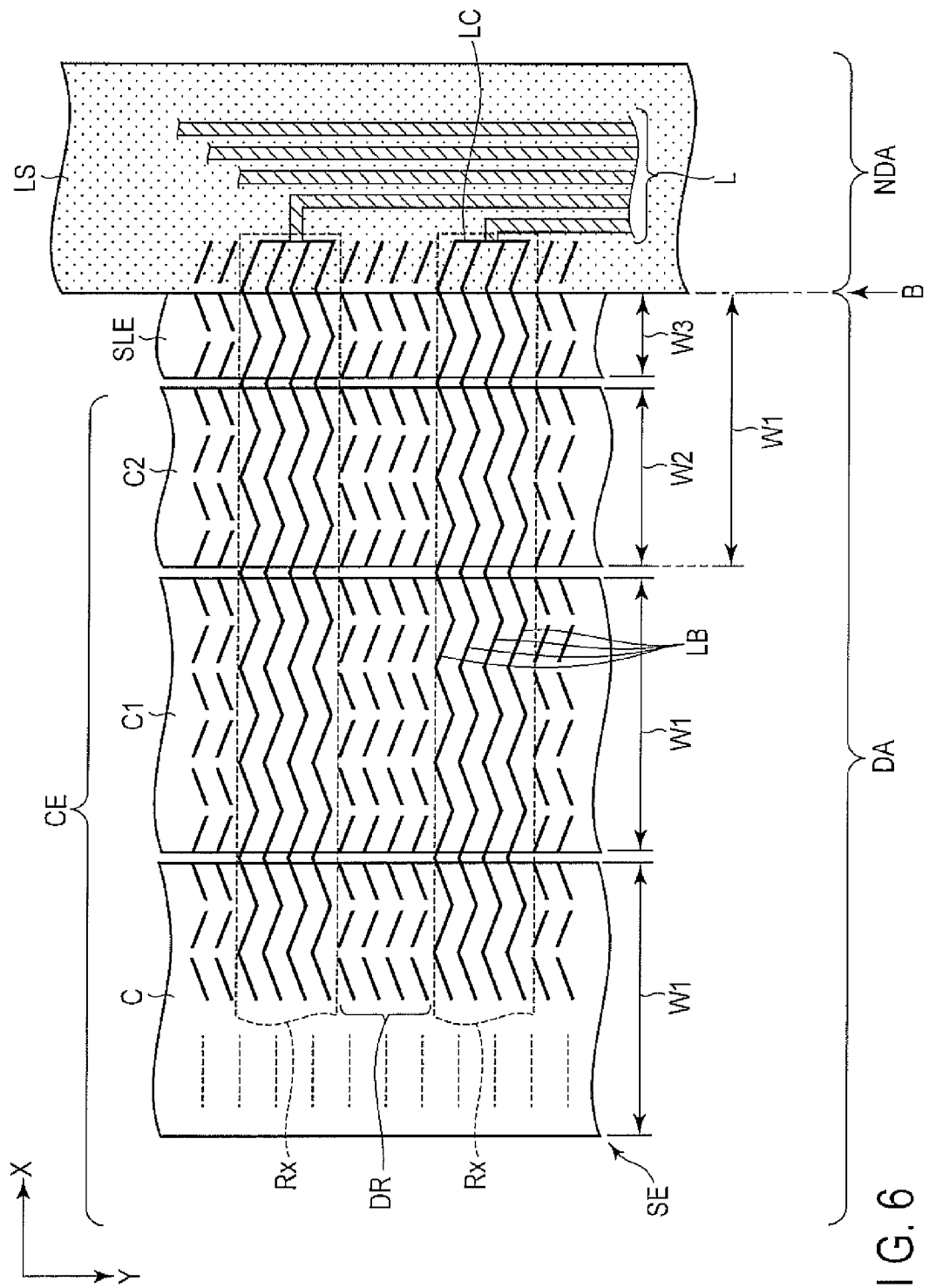
FIG. 6 is a plan view which schematically shows the structure of the sensor shown in FIG. 5 in a partly enlarged fashion.

FIG. 6 is a plan view which schematically shows the sensor SE shown in FIG. 5 in a partly enlarged fashion.

A peripheral light shielding layer LS is provided with the non-display area NDA. The peripheral light shielding layer LS is laid on substantially the entirety of the non-display area NDA. Divisional electrodes C1 and C2 included in the common electrode CE are arranged in this order in display area DA in first direction X. Divisional electrode C2 is positioned closer to the end of the display area DA as compared to divisional electrode C1. Shield electrode SLE is disposed at the end of the display area DA alongside divisional electrode C2. More specifically, shield electrode SLE is provided between divisional electrode C2 and a boundary B between the display area DA and the non-display area NDA. Note that the boundary B corresponds to the edge at the display area side of the peripheral light shielding layer LS. The end of the display area DA is a part close to the boundary B within the display area.

Divisional electrode C1 has an electrode width W1 in first direction X and divisional electrode C2 has an electrode width W2 in first direction X. Electrode width W2 is less than electrode width W1. Note that the opposite side of the display area DA which is not show is designed similarly and the divisional electrode at the other end of the display area DA (the left end in FIG. 5) has the same electrode width W2. That is, amongst the divisional electrodes C, the two divisional electrodes at the each end of the display area DA have the electrode width W2 while the other divisional electrodes therebetween have electrode width W1.

Shield electrode SLE has an electrode width W3 in first direction X. For example, the sum of electrode width W2 and electrode width W3 is equal to electrode width W1. Electrode width W3 can be varied within the range not exceeding electrode width W1. As described later, according to the research conducted by professionals including the inventors of the present application, electrode width W3 should preferably be half electrode width W1 or less. Here, each of electrode widths W1 to W3 should preferably be an integral multiple of a pixel pitch Pu of a pixel PX in first direction X. The pixel pitch Pu here is shown in FIG. 4 as a pitch at the center of two adjacent source lines S in first direction X.

Lead lines L are disposed within the non-display area NDA. That is, lead lines L are disposed to be opposed to the peripheral light shielding layer LS. Each of the lead lines L extends substantially in second direction Y and arranged side by side in first direction X at substantially regular intervals within the non-display area NDA.

In the present embodiment, a detection electrode Rx is composed of a connection line LC and a plurality of detection lines LB. The connection line LC is disposed within the non-display area NDA. The connection line LC is connected to a lead line L and extends in second direction Y. The detection lines LB are disposed in the non-display area NDA to reach the display area DA. Each of the detection line LB is connected to the connection line LC within the non-display area NDA and extends substantially in first direction X within the display area DA. In the example depicted, each detection line LB is formed in a waveform (more specifically, a triangular waveform). The detection lines LB are arranged in second direction Y at substantially regular intervals.

Dummy electrodes DR are provided between detection electrodes Rx. Dummy electrodes DR are provided in parallel to detection lines LB at substantially regular intervals. Such dummy electrodes DR are not connected to lines such as lead lines L and in an electrically floating state.

In the present embodiment, lead lines L are apart from the common electrode CE with a certain gap during at least the sensing drive time. The certain gap here is greater than electrode width W3 in first direction X.

Figure 7:
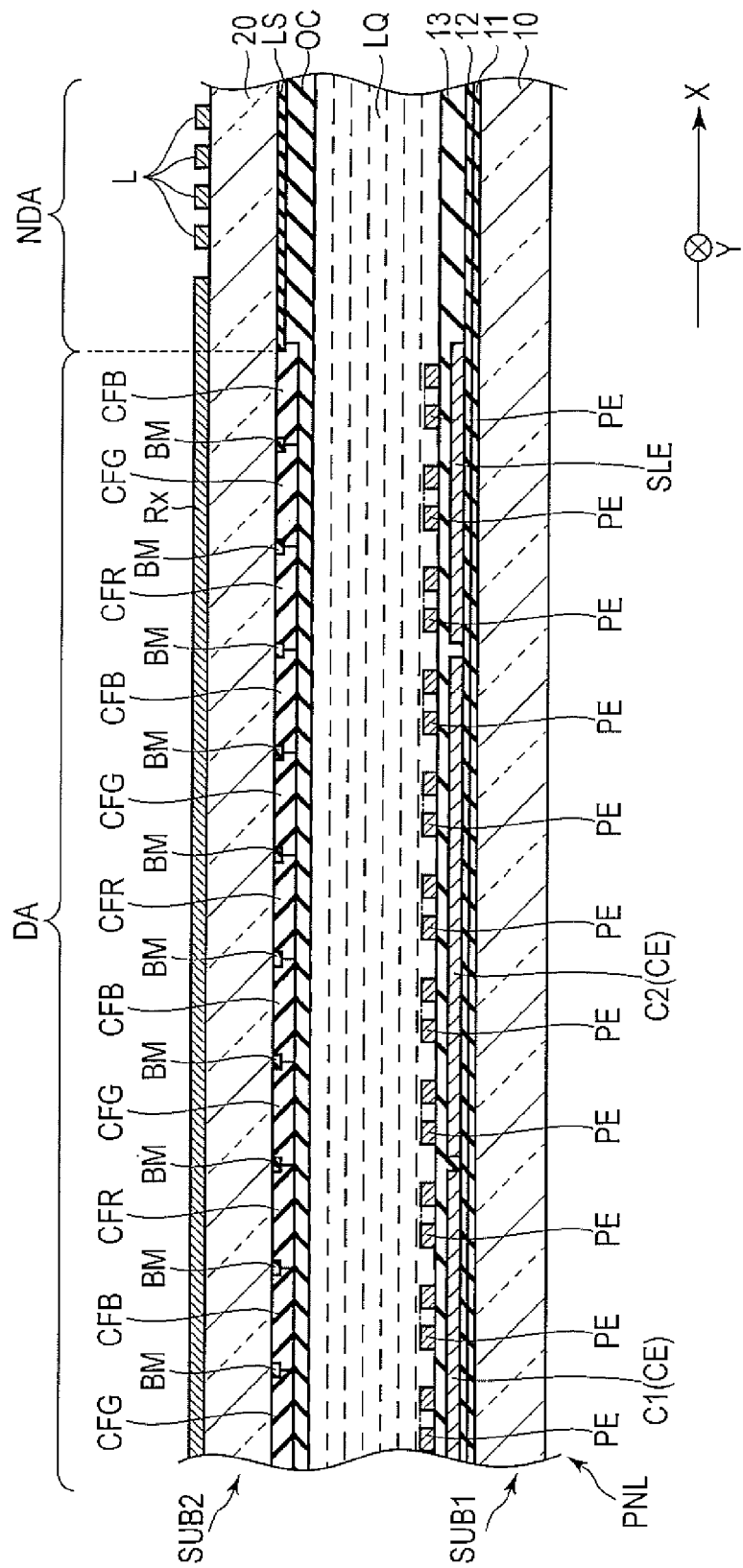
FIG. 7 is a cross-sectional view which schematically shows the structure of the liquid crystal display panel including the sensor in FIG. 6 in part.

FIG. 7 is a cross-sectional view which schematically shows the structure of the liquid crystal display panel PNL including a part of the sensor SE shown in FIG. 6. Note that only the main part which is necessary for the explanation is depicted here.

The common electrode CE, pixel electrode PE, and shield electrode SLE are disposed in the first substrate SUB1 at its inner surface side opposed to the second substrate SUB2. That is, the common electrode CE and the shield electrode SLE are formed on the second insulating film 12 and are covered with the third insulating film 13. The shield electrode SLE consists of a transparent conductive material such as ITO and IZO as with the common electrode CE. The pixel electrode PE is formed on the third insulating film 13 and is opposed to the common electrode CE or the shield electrode SLE. In the example depicted, pixel electrodes PE of five pixels are disposed immediately above the divisional electrode C2 and pixel electrodes PE of three pixels are disposed immediately above the shield electrode SLE; however, the number of the pixel electrodes above each of the common electrode CE and the shield electrode SLE is not limited thereto. Note that various lines including source line and the like and the first alignment film are omitted from the depiction.

Black matrix BM, color filters CFR, CFG, and CFB, overcoat layer OC, and peripheral light shielding layer LS are disposed in the second substrate SUB2 at its inner surface side opposed to the first substrate SUB1. That is, the color filters CFR, CFG, and CFB are formed to be opposed to each pixel electrode PE within the display area DA. The black matrix BM is disposed at boundaries between the color filters CFR, CFG, and CFB. The peripheral light shielding layer LS is formed on the inner surface side of the second insulating substrate 20. The peripheral light shielding layer LS is of the same material as the black matrix BM. The overcoat layer OC extends over the display area DA and the non-display area NDA. Note that the second alignment film is omitted from the depiction.

The detection electrodes Rx and lead lines L are formed on the second substrate SUB2 at its external surface side which is the other side of the side opposed to the first substrate SUB1. The detection electrodes Rx and lead lines L are formed of a metal such as aluminum (Al), titanium (Ti), silver (Ag), molybdenum (Mo), tungsten (W), copper (Cu), or chrome (Cr). Note that, although the detection electrodes Rx within the display area DA are formed of the above-mentioned opaque metal, the transmissivity of each pixel is not significantly reduced since they are composed of detection lines LB which are thin lines of, for example, 3 to 5 µm. Furthermore, each detection line LB is composed of thin lines extended in a direction which is different from the arrangement directions of the pixels (first direction X and second direction Y). Thus, moire produced between the detection lines LB and the pixel layout is suppressed and deterioration of display quality can be suppressed. Note that the detection electrodes Rx may be composed of stripe-like electrodes of a transparent conductive material such as ITO instead of the metallic detection lines LB.

Now, the operation of the display drive time in which images are displayed in the liquid crystal display device DSP of the FFS mode will be explained.

First, the off-state where a fringe field is not formed in the liquid crystal layer LQ is explained. The off-state is a state where a potential difference is not formed between the pixel electrode PE and the common electrode CE. Furthermore, during the display drive time, the shield electrode SLE functions similarly to the common electrode CE, and thus, a potential difference is not formed between the pixel electrode PE and the shield electrode SLE, either.

In this off-state, liquid crystal molecules in the liquid crystal layer LQ are aligned in the same orientation within X-Y plane as their initial alignment by the alignment restriction force between the first alignment film AL1 and the second alignment film AL2. The light from the backlight unit BL partly transmits the polarizer of the first optical element OD1 and is incident on the liquid crystal display panel PNL. The light incident on the liquid crystal display panel PNL is linear polarization which is orthogonal to an absorption axis of the polarizer. The state of the linear polarization does not substantially change when passing though the liquid crystal display panel PNL in the off-state. Thus, the majority of the linear polarization which have passed through the liquid crystal display panel PNL are absorbed by the polarizer of the second optical element OD2 (black display). Consequently, the light from the backlight unit does not pass through the liquid crystal display panel and the display area turns to the black display. Such a mode in which the liquid crystal display panel PNL in the off-state turns to the black display is referred to as the normally black mode.

Next, the on-state where a fringe field is formed in the liquid crystal layer LQ is explained. The on-state is a state where a potential difference is produced between the pixel electrode PE and the common electrode CE. Furthermore, during the display drive time, the shield electrode SLE functions similarly to the common electrode CE, and thus, a potential difference is produced between the pixel electrode PE and the shield electrode SLE, too. That is, a common driving signal is supplied from the common electrode driving circuit CD to the common electrode CE while it is supplied from the shield electrode driving circuit SLD to the shield electrode SLE. That is, the shield electrode functions as the common electrode during the on-state. In the present embodiment, the same common driving signal supplied to the divisional electrode C2 alongside the shield electrode SLE is supplied to the shield electrode SLE, too. On the other hand, an image signal to form the potential difference with respect to the common potential is supplied to the pixel electrode PE. Consequently, a fringe field is produced between the pixel electrode PE and the common electrode CE in the on-state.

In this on-state, the liquid crystal molecules are aligned in the orientation different from that of the initial alignment within X-Y plane because of the fringe field formed within the liquid crystal layer. In the on-state, the linear polarization which is orthogonal to the absorption axis of the polarizer of the first optical element OD1 is incident on the liquid crystal display panel PNL and its polarization state changes depending on the alignment of the liquid crystal molecules when passing through the liquid crystal layer LQ. Thus, in the on-state, at least part of the light which has passed through the liquid crystal layer LQ passes through the polarizer of the second optical element OD2 (white display).

With this structure, a normally black mode is achieved. In the display area DA, display is achieved by not only the area in which the common electrode CE and the pixel electrode PE are opposed to each other but also the area in which the shield electrode SLE and the pixel electrode PE are opposed to each other.

Now, the operation of the sensing drive time in which sensing for a contact or approach of an object is performed in the liquid crystal display device DSP will be explained.

As mentioned above, the sensor driving signal is supplied from the common electrode driving circuit CD to the common electrode CE. At that time, the shield electrode SLE is maintained at the potential different from the sensor driving signal. For example, the shield electrode driving circuit SLD maintains the shield electrode SLE to ground potential, or switches the shield electrode SLE to the electrically floating state. In such a condition, sensing is performed.

Here, a principle of a sensing method will be explained for example with reference to FIG. 8.

As shown in FIG. 8, the detection electrodes Rx are provided at least within the display area DA and produce a read signal Vr between them and the common electrode CE. A capacitance Cc exists between the divisional electrodes C and the detection electrodes Rx. That is, a capacitive coupling is created between the detection electrodes Rx and divisional electrodes C (common electrode CE). Pulsatory write signal (sensor driving signal) Vw is written to each of the divisional electrodes C one after another at certain periods. In the example depicted, a finger of a user is given to be close to a crossing point of a particular detection electrode Rx and a particular divisional electrode C. The finger close to the detection electrode Rx produces a capacitance Cx. When the pulsatory write signal Vw is supplied to the divisional electrodes C, the particular detection electrode Rx shows a pulsatory read signal (sensor output value) Vr of which level is less than that is obtained from the other detection electrodes. That is, when detecting input position data which is the positional data of the user's finger within the display area DA, driver IC chip IC1 (common electrode driving circuit CD) as the first driver supplies the write signal Vw to the common electrode CE (divisional electrodes C) and produces a sensor signal between the common electrode CE and the sensor SE. Driver IC chip IC2 as the second driver is connected to the sensor SE to read the read signal Vr indicative of a change in the sensor signal (for example, a change in capacitance produced in the detection electrodes Rx).

The detection circuit RC shown in FIG. 5 can detect two-dimensional positional data of the finger within the X-Y plane of the sensor SE based on the timing when the write signal Vw is supplied to the divisional electrodes C and the read signal Vr from each detection electrode Rx. Furthermore, capacitance Cx varies between the states where the finger is close to the detection electrode Rx and where the finger is distant from the detection electrode Rx. Thus, the level of the read signal Vr varies between the states where the finger is close to the detection electrode Rx and where the finger is distant from the detection electrode Rx. Using this mechanism, the detection circuit RC may detect the proximity of the finger with respect to the sensor SE (distance between the finger and the sensor SE in the normal direction) based on the level of the read signal Vr.

Furthermore, in the proximity of the outermost periphery of the display area DA, there is an area in which the detection electrodes Rx cross the shield electrode SLE. Even if an object contacts or approaches such an area, a capacitance toward the area is produced in the divisional electrode C2 at its shield electrode side edge. Therefore, a touch detection is performed securely in such a crossing area, that is, on the shield electrode.

That is, during the touch detection operation, because a signal other than the sensor driving signal is supplied to the shield electrode SLE, no capacitance is produced between the shield electrode SLE and the detection electrodes Rx. Furthermore, no capacitance is produced between the shield electrode SLE and the lead lines L. Consequently, a gap the width of the shield electrode SLE is formed between the divisional electrode C2 forming a capacitance with the detection electrodes RX and the lead lines L, and a physical distance produced by the gap suppresses the capacitance between the divisional electrode C2 and the lead lines L. On the other hand, a physical distance between the shield electrode SLE and detection electrodes Rx becomes relatively small in an oblique direction, and it produces a capacitance therebetween by which the detection of a contact or approach of an object can be achieved.

Display drive and sensing drive are performed within, for example, a single frame period. In one example, one frame period is divided into a first period and a second period. During the first period, display drive is performed to write an image signal to every pixel in the display area DA in a timesharing manner (display period). During the second period following the first period, sensing drive is performed to detect an object over the entirety of the display area DA in a timesharing manner (touch detection period or sensing period).

In another example, one frame period is divided into several more periods. Furthermore, the display area DA is divided into a plurality of blocks, and display drive and sensing drive are performed block by block. That is, during a first period of one frame period, first display drive is performed to write the image signal to pixels within a first display block of the display area DA. During a second period following the first period, first sensing drive is performed to detect an object within a first sensing block of the display area DA. Here, the first sensing block and the first display block may be the same block or may be different blocks. During a third period following the second period, second display drive is performed to write an image signal to pixels within a second display block which is different from the first display block. Then, during a fourth period following the third period, second sensing drive is performed to detect an object within a second sensing block which is different from the first sensing block. As above, display drive and sensing drive can be performed one after another within one frame period for writing the image signal to every pixel in the display area DA while detecting an object in the entirety of the display area DA.

In the above-described first embodiment, the shield electrode SLE between the common electrode CE and lead lines L is maintained to be a fixed potential or switched to be the floating state during the sensing drive time. Therefore, even in a structure in which the common electrode CE and lead lines L are in the proximity for satisfying the narrower frame demand, the parasitic capacitance between the common electrode CE and lead lines L can be reduced. That is, malfunction of the sensor SE due to the capacitive coupling between the common electrode CE and lead lines L can be suppressed. Note that the potential of the shield electrode SLE during the sensing drive time is not limited to the above-described example as long as the reduction of the parasitic capacitance between the common electrode CE and lead lines L is achievable.

Furthermore, the shield electrode SLE is disposed within the display area DA and functions similarly to the common electrode CE during the display drive time. Therefore, as compared to a case where the shield electrode SLE is disposed within the non-display area NDA, a space for the shield electrode SLE in the non-display area NDA is not necessary in the present embodiment, and therefore, it is suitable for the narrower frame structure. Additionally, since the shield electrode SLE and the common electrode CE are disposed together on the second insulating film 12, they can be manufactured with the same material through the same process. Thus, an additional process to form the shield electrode SLE is not necessary in the present embodiment.

Furthermore, since the detection lines LB of the detection electrodes Rx and lead lines L are disposed on the outer surface of the second insulating substrate 20, they can be manufactured with the same material through the same process. Additionally, both the detection lines LB and lead lines L can be formed of a metal having very low electrical resistance which is even lower than a transparent conductive material, and thus, the lines can be narrowed while being routed long distance. Since the line width of the lead lines L is narrow, formation of an unwanted capacitance between the lead lines L and an object which contacts or approaches the non-display area NDA can be suppressed for better noise reduction.

In the present embodiment, electrode width W3 of the shield electrode SLE should preferably be half electrode width W1 of the divisional electrode C1 or less. That is, divisional electrodes C of the common electrode CE are arranged with regular pitch and have the regular electrode width W1 except the divisional electrode C2 which is adjacent to the shield electrode SLE. Electrode width W2 of the divisional electrode C2 is narrower by the width of the shield electrode SLE. As electrode width W3 of the shield electrode SLE becomes greater, a gap between the common electrode CE and lead lines L can be secured and noise due to the parasitic capacitance between the common electrode CE and lead lines L can be reduced. On the other hand, since the shield electrode SLE does not function as a sensor driving electrode, sensing performance will be lowered in the proximity of the outermost periphery of the display area DA.

In consideration of this point, professionals including the inventors of the present application conducted an experiment to measure a degree of line noise on lead lines L and a touch signal at the time when an object touched the proximity of the outermost periphery of the display area DA where electrode width W1 is set constant and electrode width W3 is changed. FIG. 9 shows results.

Note that, in this experiment, electrode width W1, electrode width W3, and electrode width W2 of the divisional electrode C2 are given that W1=W2+s+W3 where electrode width W1 is the width of the divisional electrode C1 which is the sum of the shield electrode width and the divisional electrode width, and s is a gap between the shield electrode and the divisional electrode which is set to approximately a few to a dozen μm and thus is negligible with respect to width W1.

Initially, the degree of line noise and the touch signal were measured with electrode width W1 set to 4200 μm and electrode width W3 changed within a range of 0 to 3000 μm. Results confirmed that the degree of line noise was substantially zero and deterioration of the touch signal could be suppressed when W3/W1 is 0.5 or less. Note that, when W3/W1 is 0.13 or less, the common electrode CE and lead lines L come close and the line noise was measured.

Then, the degree of line noise and touch signal were measured with electrode width W1 set to 2325 μm and electrode width W3 changed within a range of 0 to 1500 μm. Results confirmed that the degree of line noise be substantially zero and deterioration of the touch signal could be suppressed when W3/W1 is 0.5 or less. Note that, when W3/W1 is 0.32 or less, the common electrode CE and lead lines L come close and the line noise was measured.

From the results, in consideration of line noise suppression and better sensing performance, electrode width W3 should preferably be equal to or less than 0.5 times electrode width W1, and more preferably maintaining equal to or more than 0.3 times electrode width W1.

Variation of First Embodiment

Now, a variation example of the capacitive sensor SE in the liquid crystal display device DSP of the first embodiment will be explained.

Figure 10:
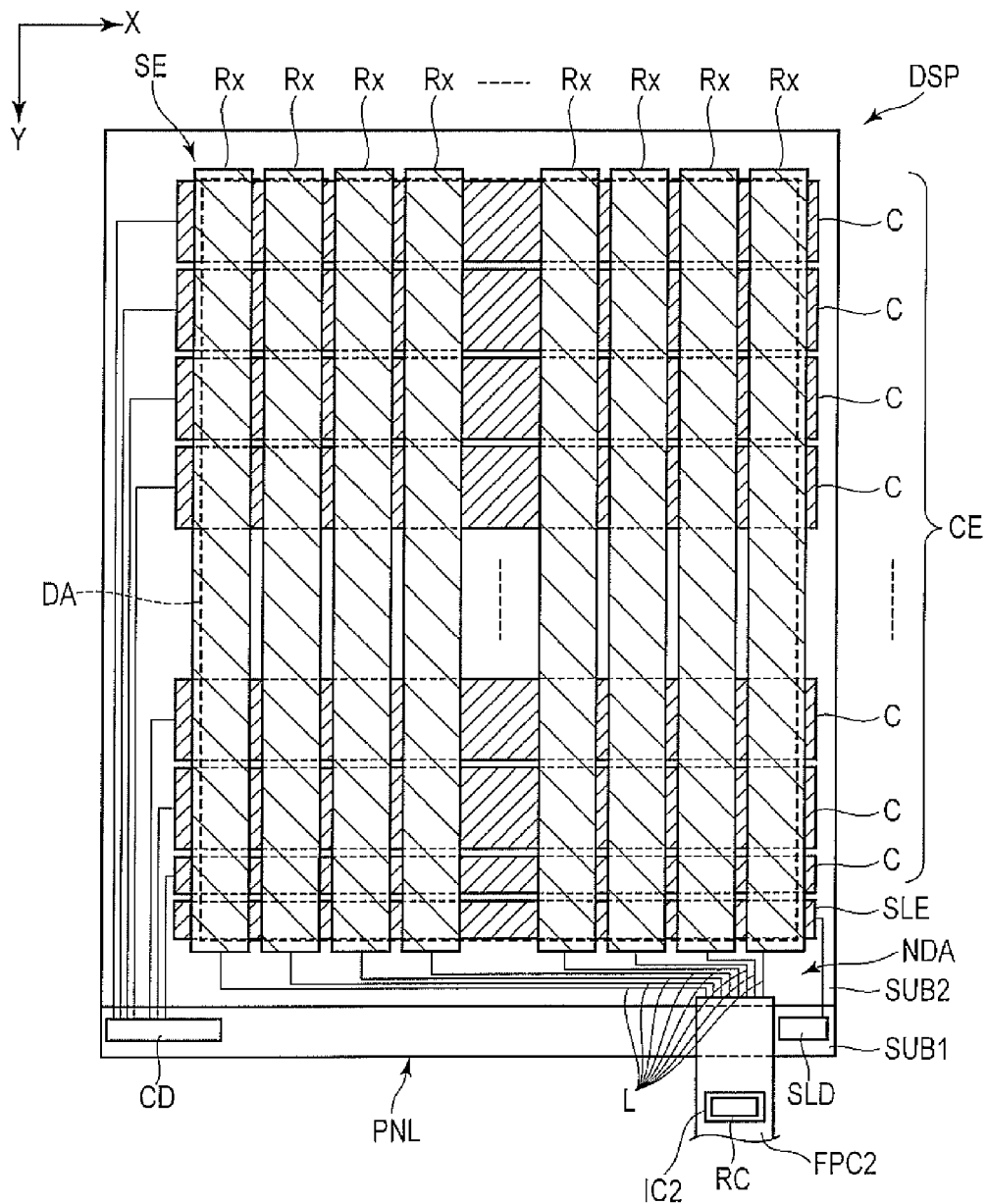
FIG. 10 is a plan view which schematically shows the other structure of the sensor of the first embodiment.

FIG. 10 is a plan view which schematically shows another structure of the sensor SE of the first embodiment.

The example shown in FIG. 10 differs from the example shown in FIG. 5 in respects of the extending directions of the electrodes, that is, each divisional electrode C of a common electrode CE and a shield electrode SLE are extended in first direction X and detection electrodes Rx are extended substantially in second direction Y.

That is, the common electrode CE includes divisional electrodes C arranged at intervals in second direction Y and extended substantially linearly in first direction X within the display area DA. The detection electrodes Rx are arranged at intervals in first direction X and extended substantially linearly in second direction Y within the display area DA. As described above, the common electrode CE and the detection electrodes Rx are opposed to each other with various dielectrics interposed therebetween. Each of the divisional electrodes C is electrically connected to the common electrode driving circuit CD.

The shield electrodes SLE are disposed at an end of the display area DA. In the example depicted, the shield electrode SLE is disposed at one end of the display area DA (bottom end in FIG. 10). The shield electrode SLE extends substantially linearly in first direction X and arranged with a divisional electrode C with a gap therebetween. The shield electrode SLE is disposed on the first substrate SUB1 at which, for example, the common electrode CE is also disposed. Each of the shield electrodes SLE is electrically connected to the shield electrode driving circuit SLD.

Lead lines L are disposed within the non-display area NDA and are electrically connected to the detection electrodes Rx one to one. In the example depicted, lead lines L are disposed within the non-display area NDA at one end of the display area DA. Such lead lines L are, for example, disposed on the second substrate SUB2 as with the detection electrodes Rx. Lead lines L are electrically connected to the detection circuit RC individually via flexible printed circuit FPC2.

In this variation, the advantages obtained in the above example can be obtained. In addition thereto, the length of lead lines L connecting between each detection electrode Rx and flexible printed circuit FPC2 can be shortened in this variation as compared to the example shown in FIG. 5. Thus, noise of lead lines L can be further reduced.

As can be understood form the above, according to the first embodiment and its variation, a sensor-equipped display device with less sensor malfunction can be achieved.

Now, the technical matters related to the above-described first embodiment and its variation are specified in the following (C1a) to (C7a).

(C1a) A sensor-equipped display device comprising: a display panel including a common electrode and a pixel electrode disposed within a display area to display an image, a shield electrode disposed at an end of the display area, a detection electrode opposed to the common electrode, and a lead line disposed within a non-display area which is outside of the display area, the lead line electrically connected to the detection electrode to output a sensor output value from the detection electrode;

a first driving circuit to supply a common driving signal to the common electrode during a display drive time in which an image is displayed using the pixel electrode and to supply a sensor driving signal to the common electrode during a sensing drive time in which sensing is performed using a detection signal; and a second driving circuit to supply the common driving signal to the shield electrode during the display drive time and to maintain the shield electrode to be a potential which is different from the sensor driving signal during the sensing drive time.

(C2a) The sensor-equipped display device of (C1a), wherein the second driving circuit maintains the shield electrode to be ground potential during the sensing drive time.

(C3a) The sensor-equipped display device of (C1a), wherein the second driving circuit switches the shield electrode to an electrically floating state during the sensing drive time.

(C4a) The sensor-equipped display device of (C1a), wherein the display panel includes a first substrate and a second substrate arranged opposite to each other with a gap therebetween, the common electrode, the pixel electrode, and the shield electrode are disposed on the first substrate at an inner surface side opposed to the second substrate, and the detection electrode and the lead line are disposed on the second substrate at an external surface side which is the other side of the side opposed to the first substrate.

(C5a) The sensor-equipped display device of (C1a), wherein the common electrode includes a first divisional electrode and a second divisional electrode which are arranged in a first direction at intervals and are extended in a second direction which crosses the first direction, the second divisional electrode disposed closer to an end of the display area as compared to the first divisional electrode, and the shield electrode extends in the second direction, and is located between the second divisional electrode and a boundary between the display area and the non-display area.

(C6a) The sensor-equipped display device of (C5a), wherein the first divisional electrode has a first electrode width in the first direction and the second divisional electrode has a second electrode width which is less than the first electrode width in the first direction.

(C7a) The sensor-equipped display device of (C6a), wherein the shield electrode has a third electrode width in the first direction where the sum of the second electrode width and the third electrode width is equal to the first electrode width, and the third electrode width is half the first electrode width or less.

Now, second to fifth embodiments and their variations will be explained.

Initially, a basic concept of the second to fifth embodiments and their variations is explained.

Sensor-equipped display devices are configured to detect data input above a display surface by input means. Here, the sensor is a capacitive sensor including a sensor driving electrode, a detection electrode disposed to be opposed to the sensor driving electrode, and a lead line connected to the detection electrode. As such input means, a conductor such as a stylus or a digit may be employed. Thereby, the display devices can detect the positional data indicative of which position on the input surface of the display device a finger or the like touches or approaches.

Recently, a display area of a display device is enlarged for enhanced image display and in accordance with this trend, a frame area around the display area (non-display area) is required to be as narrow as possible. Thus, in the technical field of the display device, the frame area is reduced in many cases. To reduce the frame area, there has been an attempt to provide lead lines within the frame area in proximity to a sensor driving electrode.

However, when the sensor driving electrode and lead lines come close to each other, a capacitive coupling (parasitic capacitance) is produced between the sensor driving electrode and the lead lines. As the sensor driving electrode and lead lines come closer, the parasitic capacitance therebetween becomes greater. Consequently, when a conductor contacts or approaches the input surface of the display device in the proximity of the outermost periphery of the display area, the parasitic capacitance between the sensor driving electrode and lead lines changes and noise occur in lead lines. In other words, concerning two amplitudes one of which is of a read signal indicative of a change in the capacitance of the detection electrodes which is transferred to lead lines (degree of capacitive coupling) and the other of which is of a noise signal of the noise in lead lines produced by the parasitic capacitance, a ratio between these two amplitudes, that is, the signal-to-noise ratio is decreased.

The above problem will be solved by and a sensor-equipped display device which can detect input position accurately will be achieved by the second to fifth embodiments and their variations. Now, means and methods for solving the above problems will be explained in detail.

Second Embodiment

The sensor-equipped display device of the second embodiment will be explained. The sensor-equipped display device of the present embodiment differs from that of the first embodiment in respect of some components omitted, that is, the shield electrode SLE and the shield electrode driving circuit SLD are omitted from the sensor-equipped display device of the present embodiment.

FIG. 11 is a plan view which schematically shows a structural example of the sensor SE of the present embodiment. In FIG. 11, driver IC chip IC1 is omitted from the depiction, and note that the common electrode driving circuit CD is provided with driver IC chip IC1 as described above.

As shown in FIG. 11, the sensor SE of the present embodiment includes a common electrode CE on a first substrate SUB1 side, and detection electrodes Rx, lead lines L and connection lines LC on a second substrate SUB1 side. That is, the common electrode CE functions as an electrode for display and also as an electrode for sensor driving.

The common electrode CE and the detection electrodes Rx are disposed within the display area DA. In the example depicted, the common electrode CE includes a plurality of stripe-like divisional electrodes C which are arranged in first direction X at intervals and extended substantially linearly in second direction Y within the display area DA. Amongst the divisional electrodes C, the divisional electrode C positioned at the outermost in first direction X within the display area DA has a side edge opposed to the lead line L, and the side edge and the outer periphery of the display area DA are on the same plane.

In the present embodiment, the state of the liquid crystal display panel PNL being viewed from the top is referred to as in plane view. That is, the expression of in plane view indicates the state of the liquid crystal display panel PNL being viewed from the normal of the display surface (the liquid crystal display panel PNL being viewed oppositely in third direction Z). Therefore, the expression of in plane view can be reworded into in the state of the liquid crystal display panel PNL being viewed oppositely in third direction Z.

The width of the non-display area NDA should preferably be set to 1 mm or less. In the non-display area NDA of the example depicted, width Wa of first area A1 at the right side of the second substrate SUB2 (a stripe-like area extended in second direction Y), width Wb of second area A2 at the left side of the second substrate SUB2 (a stripe-like area extended in second direction Y), width Wc of third area A3 at the lower sided of the second substrate SUB2 (a stripe-like area extended in first direction X), and width Wd of fourth area A4 at the upper side of the second substrate SUB2 (a stripe-like area extended in first direction X) are set to 0.5 to 1.5 mm. Widths Wa and Wb are in first direction X and widths Wc and Wd are in second direction Y. Note that width Wa and width Wb should preferably be the same. Furthermore, widths Wc and Wd, either one or moth thereof, may exceed 1.5 mm.

In the present embodiment, the display area DA has a rectangular shape. Lead lines L are disposed in first area A1, second area A2, and third area A3 in the second substrate SUB2. The upper side of each divisional electrode C is disposed on the same plane in which the upper edge of the display area DA is set and the lower side of each divisional electrode C is disposed on the same plane in which the lower edge of the display area DA is set. A side edge of each of the divisional electrodes C at the both ends opposed to lead lines L on the same plane in which the outer periphery of the display area DA is set.

Detection electrodes Rx are arranged in second direction Y at intervals and extended substantially linearly in first direction X within the display area DA. That is, the detection electrodes Rx are extended to cross the divisional electrodes C. The detection electrodes Rx are formed of a plurality of metal lines corresponding to a plurality of detection lines LB described later. As mentioned above, the common electrode CE (divisional electrodes C extended in second direction Y) is opposed to the detection electrodes Rx extended in first direction X with various dielectrics interposed therebetween.

The number, size, and shape of the divisional electrodes C are not limited specifically and can be changed arbitrarily. Furthermore, as in the example described later, common electrodes CE may be arranged in second direction Y at intervals and extended substantially linearly in first direction X. Moreover, the common electrode CE is not necessarily divided and may be a single plate electrode formed continuously within the display area DA. In that case, the common electrode CE should have a planar periphery which is disposed within the display area DA to match the outer periphery thereof.

Lead lines L are disposed above an external surface ES of the liquid crystal display panel PNL within the non-display area NDA. The connection lines LC are disposed above the external surface ES of the liquid crystal display panel PNL to connect lead lines L to the detection electrodes Rx. In the present embodiment, the connection lines LC are extended in first direction X. Lead lines L and detection electrodes Rx are electrically connected to each other one to one via the connection lines LC.

Each of the lead lines L outputs a sensor output value from its corresponding detection electrode Rx. In the example depicted, lead lines L are disposed in first area A1 of the second substrate SUB2, or second area A2 and third area A3 of the second substrate SUB2. For example, amongst the connection lines LC arranged in second direction Y, the connection lines LC connected to the odd-numbered detection electrodes Rx are disposed in second area A2, and the connection lines LC connected to even-numbered detection electrodes Rx are disposed in first area A1. Such a layout of lead lines L and connection lines LC conforms to such demands that width Wa and width Wb be uniformed and that the frame of the liquid crystal display device DSP be narrowed. Connection lines LC and lead lines L are, for example, disposed above the external surface ES of the liquid crystal display panel PNL as with the detection electrodes Rx.

Furthermore, lead lines L are in plane view disposed to be apart from the edge of the common electrode CE with distance D1 which is 30 µm or more. In other words, in the present embodiment, lead lines L are in plane view disposed apart from the outer periphery of the display area with distance D1.

When the liquid crystal display panel PNL is viewed from the top as in FIG. 11, lead lines L in first area A1 are formed in a letter I as being extended from flexible printed circuit FPC2 in second direction Y and apart from a side edge of the rightmost divisional electrode C in the display area DA in first direction X with distance D1. Lead lines L in second area A2 and third area A3 are formed in a letter L as being extended from flexible printed circuit FPC2 to an opposite direction of first direction X and then extended in an opposite direction of second direction Y. The lead lines L formed in a letter L are apart from a side edge of the leftmost divisional electrode C in the display area DA in first direction X with distance D1 and also apart from the lower side of the divisional electrodes C in second direction Y with distance D1.

The liquid crystal display device DSP includes a common electrode driving circuit (first driver) CD disposed in the non-display area NDA. Each of the divisional electrodes C is electrically connected to the common electrode driving circuit CD. The common electrode driving circuit CD supplies a common driving signal to the common electrode CE at the display drive time in which an image is displayed and supplies a sensor driving signal to the common electrode CE at the sensing drive time in which sensing is performed.

Flexible printed circuit FPC2 is connected to an outer lead bonding (OLB) pad group disposed above the external surface ES of the liquid crystal display panel PNL within the non-display area NDA. Each pad of the OLB pad group is electrically connected to the detection electrode Rx via lead line L and connection line LC. In this embodiment, not only the detection electrodes Rx but also connection lines LC and lead lines L are formed of metal as a conductive material. When lead lines L are formed of a metal having a very low electrical resistance which is even lower than a transparent conductive material, the width of lead lines L can be reduced. Since the OLB pad group can be concentrated at one point in fourth area A4 in the second substrate SUB2, size and cost reduction of flexible printed circuit FPC2 can be expected.

The detection circuit RC is accommodated in, for example, driver IC chip IC2. The detection circuit RC detects a contact or approach of a conductor to the input surface IS of the liquid crystal display device DSP based on a sensor output value from the detection electrodes Rx. Furthermore, the detection circuit RC can detect positional data of a point where the conductor contacts or approaches. Note that the detection circuit RC may be accommodated in the control module CM instead.

Figure 12:
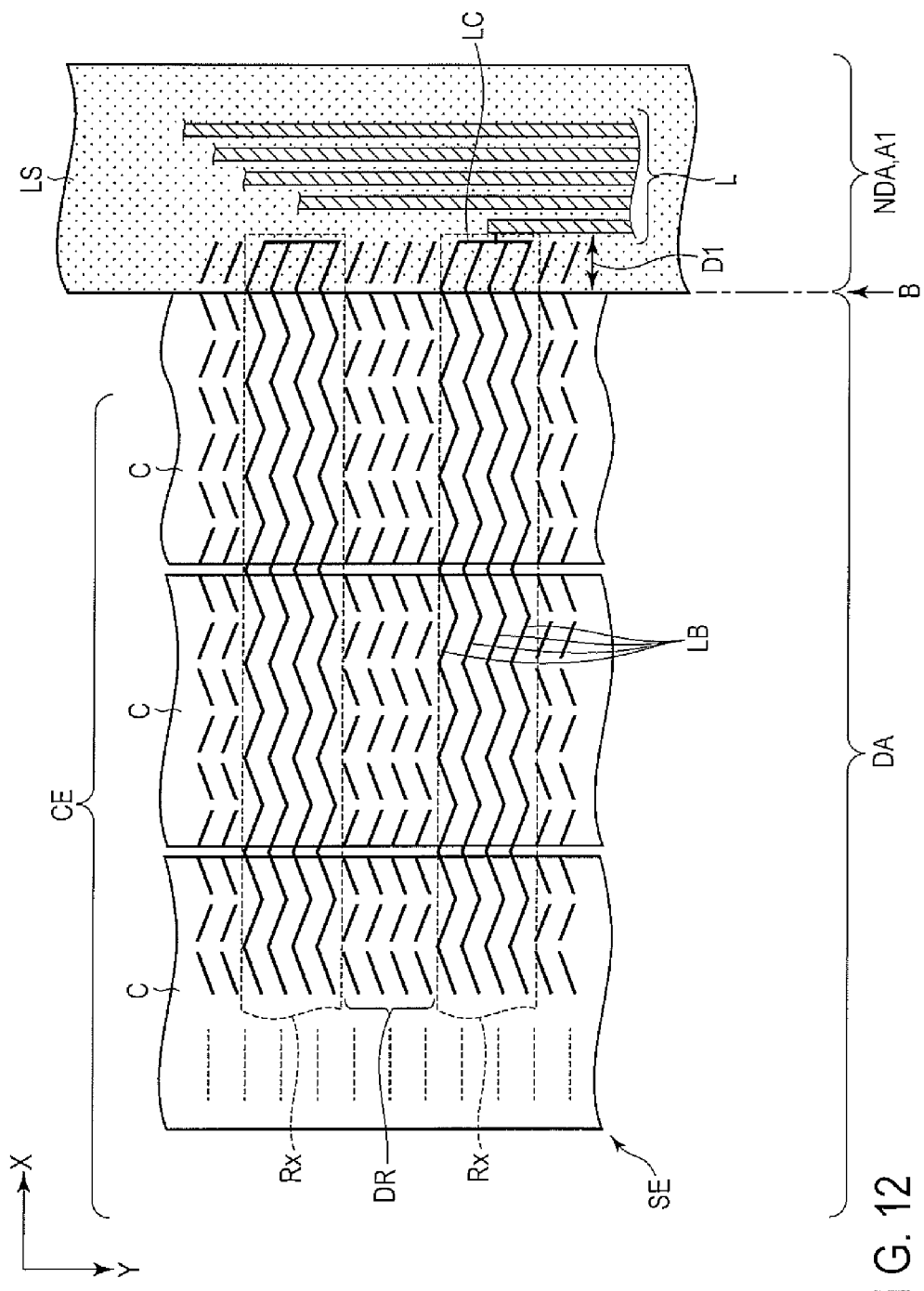
FIG. 12 is a plan view which schematically shows the sensor of the second embodiment in a partly enlarged manner.

FIG. 12 is a plan view which schematically shows the sensor SE shown in FIG. 11 in a partly enlarged fashion.

A peripheral light shielding layer LS is provided with the non-display area NDA. The peripheral light shielding layer LS is laid on substantially the entirety of the non-display area NDA. Divisional electrodes C included in the common electrode CE are arranged in first direction X within the display area DA. Boundary B between the display area DA and the non-display area NDA corresponds to the edge (inner periphery) at the display area side of the peripheral light shielding layer LS. The end of the display area DA is a part close to the boundary B within the display area.

Lead lines L are disposed within the non-display area NDA. That is, lead lines L are disposed opposite to the peripheral light shielding layer LS. Each of the lead lines L extends substantially in second direction Y and arranged side by side in first direction X at substantially regular intervals within the non-display area NDA. In the example shown in FIGS. 11 and 12, distance D1 is an in plane view distance from an edge of the common electrode CE to the lead line L opposed to the edge in the closest proximity. Furthermore, the distance D1 is an in plane view distance from the edge of the common electrode CE to a side of the lead line L opposed to the edge in the closest proximity. Therefore, in the present embodiment, lead lines L are apart from the common electrode CE with a certain gap during the display drive time and the sensing drive time. The certain gap is distance D1 or more. The connection lines LC are disposed within the non-display area NDA. The connection lines LC are extended in second direction Y. In the present embodiment, the connection lines LC are formed in a letter T.

The detection electrode Rx is composed of a plurality of detection lines LB. The detection lines LB are disposed in the display area DA. In the present embodiment, the detection lines LB are disposed in the display area DA to reach the non-display area NDA. The detection lines LB are connected to the connection line LC within the non-display area NDA and extends substantially in first direction X within the display area DA. In the example depicted, each of the detection lines LB is formed in a waveform (more specifically, a triangular wave form). The detection lines LB are arranged in second direction Y at substantially regular intervals.

Dummy electrodes DR are provided between detection electrodes Rx. Dummy electrodes DR are provided in parallel to detection lines LB at substantially regular intervals. Such dummy electrodes DR are not connected to lines such as lead lines L and in an electrically floating state.

Figure 13:
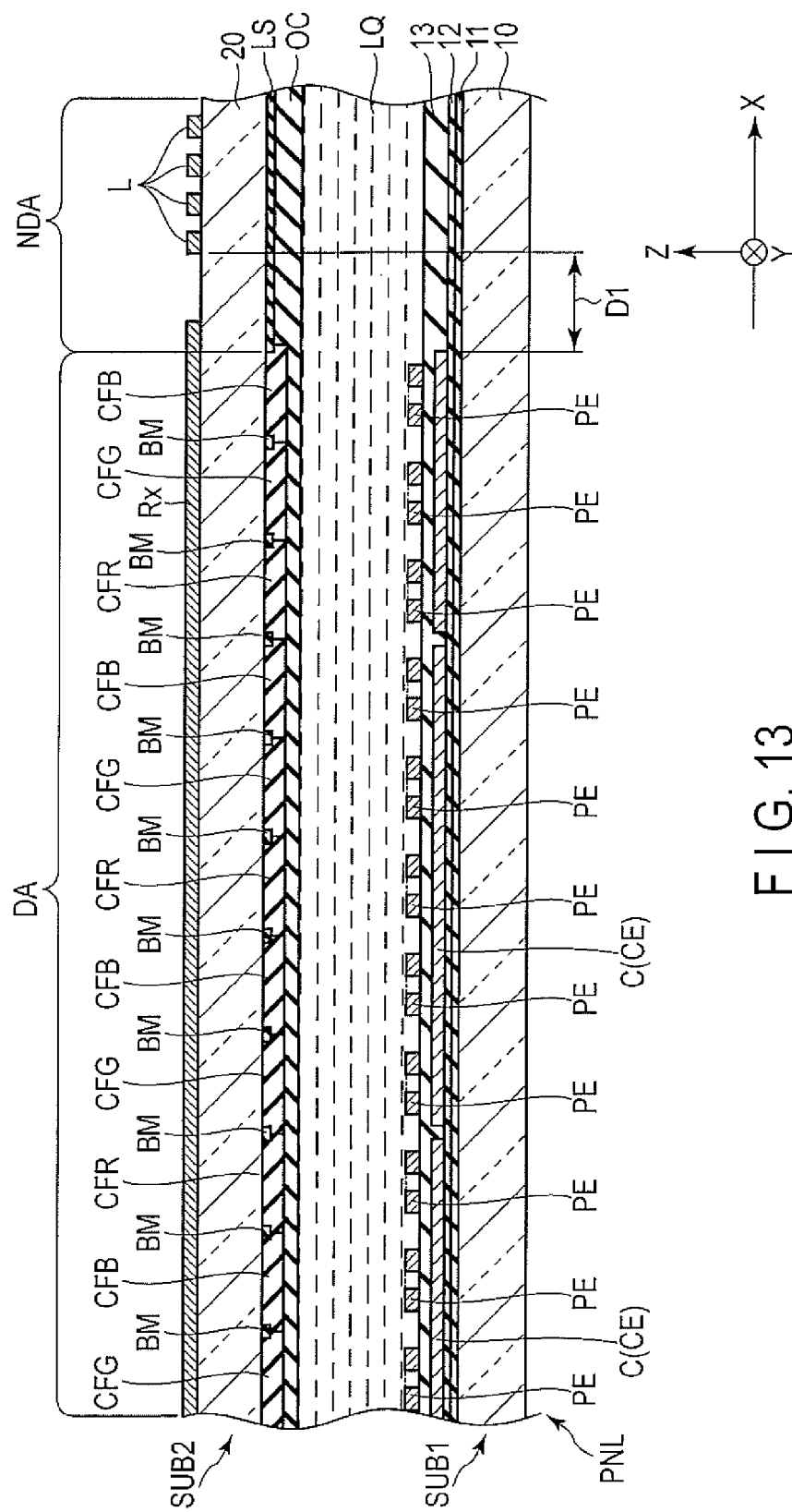
FIG. 13 is a cross-sectional view which schematically shows the structure of the liquid crystal display panel including the sensor of the second embodiment in part.

FIG. 13 is a cross-sectional view which schematically shows the structure of the liquid crystal display panel PNL including a part of the sensor SE. Note that only the main part which is necessary for the explanation is depicted here.

As shown in FIG. 13, the common electrode CE and the pixel electrodes PE are disposed in the first substrate SUB1 at its inner surface side opposed to the second substrate SUB2. That is, the common electrode CE is formed on the second insulating film 12 and is covered with the third insulating film 13. The pixel electrode PE is formed on the third insulating film 13 and is opposed to the common electrode CE. In the example depicted, pixel electrodes PE of eight pixels are disposed immediately above each divisional electrode C; however, the number of the pixel electrodes above each divisional electrode C is not limited thereto. Note that various lines including source line and the like and the first alignment film are omitted from the depiction.

Black matrix BM, color filters CFR, CFG and CFB, overcoat layer OC, and peripheral light shielding layer LS are disposed in the second substrate SUB2 at its inner surface side opposed to the first substrate SUB1. That is, the color filters CFR, CFG, and CFB are formed opposite to each pixel electrode PE within the display area DA. The black matrix BM is disposed at boundaries among the color filters CFR, CFG, and CFB. The peripheral light shielding layer LS is formed within the non-display area NDA on the inner surface side of the second insulating substrate 20. The peripheral light shielding layer LS is formed in a frame-like shape (rectangular frame-like shape) and has an inner periphery matching the outer periphery of the display area DA in plane view. The peripheral light shielding layer LS consists of the same material as the black matrix BM. The overcoat layer OC extends over the display area DA and the non-display area NDA. Note that the second alignment film is omitted from the depiction.

The detection electrodes Rx, lead lines L, and connection lines LC are formed on the second substrate SUB2 at its external surface side which is the other side of the side opposed to the first substrate SUB1. The Detection electrodes Rx, lead lines L, and connection lines LC are formed of a metal such as aluminum (Al), titanium (Ti), silver (Ag), molybdenum (Mo), tungsten (W), copper (Cu), or chrome (Cr). Note that, although the detection electrodes Rx within the display are DA are formed of the above-mentioned opaque metal, the transmissivity of each pixel is not significantly reduced since they are composed of detection lines LB which are thin lines of, for example, 3 to 5 μm. Furthermore, each detection line LB is composed of thin lines extended in a direction which is different from the arrangement directions of the pixels (first direction X and second direction Y). Thus, moire produced between the detection electrodes Rx and the pixel layout is suppressed and deterioration of display quality can be suppressed. Note that the detection electrodes Rx may be composed of stripe-like electrodes of a transparent conductive material such as ITO instead of the metallic detection lines LB.

Now, the operation of the display drive time in which images are displayed in the liquid crystal display device DSP of the FFS mode will be explained.

First, the off-state where a fringe field is not formed in the liquid crystal layer LQ is explained. The off-state is a state where a potential difference is not formed between the pixel electrode PE and the common electrode CE. In this off-state, liquid crystal molecules in the liquid crystal layer LQ are aligned in the same orientation within X-Y plane as their initial alignment by the alignment restriction force between the first alignment film AL1 and the second alignment film AL2. The light from the backlight unit BL partly transmits the polarizer of the first optical element OD1 and is incident on the liquid crystal display panel PNL. The light incident on the liquid crystal display panel PNL is linear polarization which is orthogonal to an absorption axis of the polarizer. The state of the linear polarization does not substantially change when passing though the liquid crystal display panel PNL in the off-state. Thus, the majority of the linear polarization which have passed through the liquid crystal display panel PNL are absorbed by the polarizer of the second optical element OD2 (black display). Consequently, the light from the backlight unit does not pass through the liquid crystal display panel and the display area turns to the black display. Such a mode in which the liquid crystal display panel PNL in the off-state turns to the black display is referred to as the normally black mode.

Next, the on-state where a fringe field is formed in the liquid crystal layer LQ is explained. The on-state is a state where a potential difference is produced between the pixel electrode PE and the common electrode CE. That is, a common driving signal (common voltage) is supplied from the common electrode driving circuit CD to the common electrode CE. On the other hand, an image signal to form the potential difference with respect to the common potential is supplied to the pixel electrode PE. Consequently, a fringe field is produced between the pixel electrode PE and the common electrode CE in the on-state.

In this on-state, the liquid crystal molecules are aligned in the orientation different from that of the initial alignment within X-Y plane because of the fringe field formed within the liquid crystal layer. In the on-state, the linear polarization which is orthogonal to the absorption axis of the polarizer of the first optical element OD1 is incident on the liquid crystal display panel PNL and its polarization state changes depending on the alignment of the liquid crystal molecules when passing through the liquid crystal layer LQ. Thus, in the on-state, at least part of the light which has passed through the liquid crystal layer LQ passes through the polarizer of the second optical element OD2 (white display).

Now, the operation of the sensing drive time in which sensing for a contact or approach of an object is performed in the input surface IS of the liquid crystal display device DSP will be explained. A sensor driving signal is supplied from the common electrode driving circuit CD to the common electrode CE. When the sensor SE receives a sensor signal from the common electrode CE in such a state, sensing is performed. Note that the method used for sensing in the first embodiment is used in the present embodiment, too.

With respect to distance D1, a change in capacitance occurs between lead lines L and the common electrode CE (the divisional electrode C which is closest to lead lines L). This is explained in detail. FIG. 14 shows results in the change in capacitance with respect to distance D1 measured by changing a thickness of the second insulating substrate 20. Note that the change in capacitance between the common electrode CE and lead lines L is produced by a finger contacting the input surface IS of the liquid crystal display device DSP in the proximity of the outermost periphery of the display area DA.

As is evident from FIG. 14, the change in capacitance depends on distance D1 and the thickness of the second insulating substrate 20. The thickness of the second insulating substrate 20 of the present embodiment is 0.5 mm, and the change in capacitance significantly decreases after distance D1 reaches 30 μm. Thus, if the thickness of the second insulating substrate 20 is 0.5 mm, distance D1 should preferably be 30 μm or more.

As is further evident from the figure, if the thickness of the second insulating substrate 20 is 0.25 mm, the change in capacitance significantly decreases after distance D1 reaches 60 μm. Thus, if the thickness of the second insulating substrate 20 is 0.25 mm, distance D1 should preferably be 60 μm or more.

As is further evident from the figure, if the thickness of the second insulating substrate 20 is 0.15 mm, the change in capacitance significantly decreases after distance D1 reaches 300 μm. Thus, if the thickness of the second insulating substrate 20 is 0.15 mm, distance D1 should preferably be 300 μm or more. FIG. 14 is plotted in such a manner that symbols ◇ and □ overlap with each other on the line indicative of distance D1 being 300 μm.

According to the sensor-equipped liquid crystal display device DSP of the second embodiment with the above-described feature, the liquid crystal display device DSP comprises the liquid crystal display panel PNL and the capacitive sensor SE disposed on the liquid crystal display panel. The liquid crystal display panel PNL includes the display area DA, non-display area NDA, common electrode CE, and pixel electrodes PE. The sensor SE includes lead lines L, detection electrodes Rx, and connection lines LC. Lead lines L are disposed within the non-display area NDA to be apart from the edge of the common electrode CE with distance D1 of 30 μm or more. The detection electrodes Rx are disposed within the display area DA and form a capacitive coupling with the common electrode CE. The connection line LC connects lead line L with detection electrode Rx. When detecting input positional data, driver IC chip IC1 (common electrode driving circuit CD) writes a write signal Vw to the common electrode CE (divisional electrodes C), and driver IC chip IC2 reads a read signal Vr indicative of a change in capacitance produced in the detection electrodes Rx.

If distance D1 is 30 μm or more as above, a change in the capacitance (parasitic capacitance) between the common electrode CE (the divisional electrode C closest to lead line L) and lead line L can be reduced. In other words, concerning two amplitudes one of which is of a read signal Vr transmitted to lead lines L and the other of which is of a noise signal of the noise in lead lines produced by the parasitic capacitance, a ratio between these two amplitudes, that is, the signal-to-noise ratio is prevented from decreasing. Therefore, the sensor SE can suppress an erroneous detection of the input positional data due to a change in the capacitance between the common electrode CE and lead lines L. Note that, as mentioned above, the suppression of an erroneous detection is better when distance D1 increases more; however, reducing the frame size will be difficult. Thus, distance D1 should be determined carefully.

Furthermore, since lead lines L, the connection lines LC, and the detection lines LB of detection electrodes Rx are disposed on the outer surface (external surface ES) of the second insulating substrate 20, they can be manufactured with the same material through the same process. Additionally, lead lines L, connection lines LC and detection lines LB can be formed of a metal having a very low electrical resistance which is even lower than a transparent conductive material, and thus, the lines can be narrowed while being routed long distance. Since the line width of the lead lines L is narrow, formation of an unwanted capacitance between the lead lines L and an object which contacts or approaches the non-display area NDA can be suppressed for better noise reduction.

Furthermore, a part of the sensor SE (detections electrodes Rx, lead lines L, and the like) is formed above the surface (external surface ES) of the second insulating substrate 20. Therefore, as compared to a case where a part of the sensor SE is formed on a substrate which is different from the second insulating substrate 20, the liquid crystal display device DSP can be made thinner.

As can be understood from the above, the sensor-equipped liquid crystal display device DSP which can detect input positional data accurately can be achieved.

Variation 1 of Second Embodiment

Now, a variation 1 of the sensor-equipped liquid crystal display device DSP of the second embodiment will be explained. FIG. 15 is a plan view which schematically shows variation 1 of the capacitive sensor SE of the second embodiment in a partly enlarged fashion.

As shown in FIG. 15, all of the lead lines L of the sensor SE may be gathered in either first area A1 or second area A2 of the second substrate SUB2. In variation 1, all of the lead lines L are gathered in first area A1 of the second substrate SUB2. In the example depicted, the lead line L in the closest proximity of the edge of the common electrode CE is disposed apart from the edge of the common electrode CE in plane view with distance D1 which is 30 μm or more.

Variation 1 of the sensor-equipped liquid crystal display device DSP of the second embodiment can achieve the same advantages obtained by the second embodiment.

Variation 2 of Second Embodiment

Figure 16:
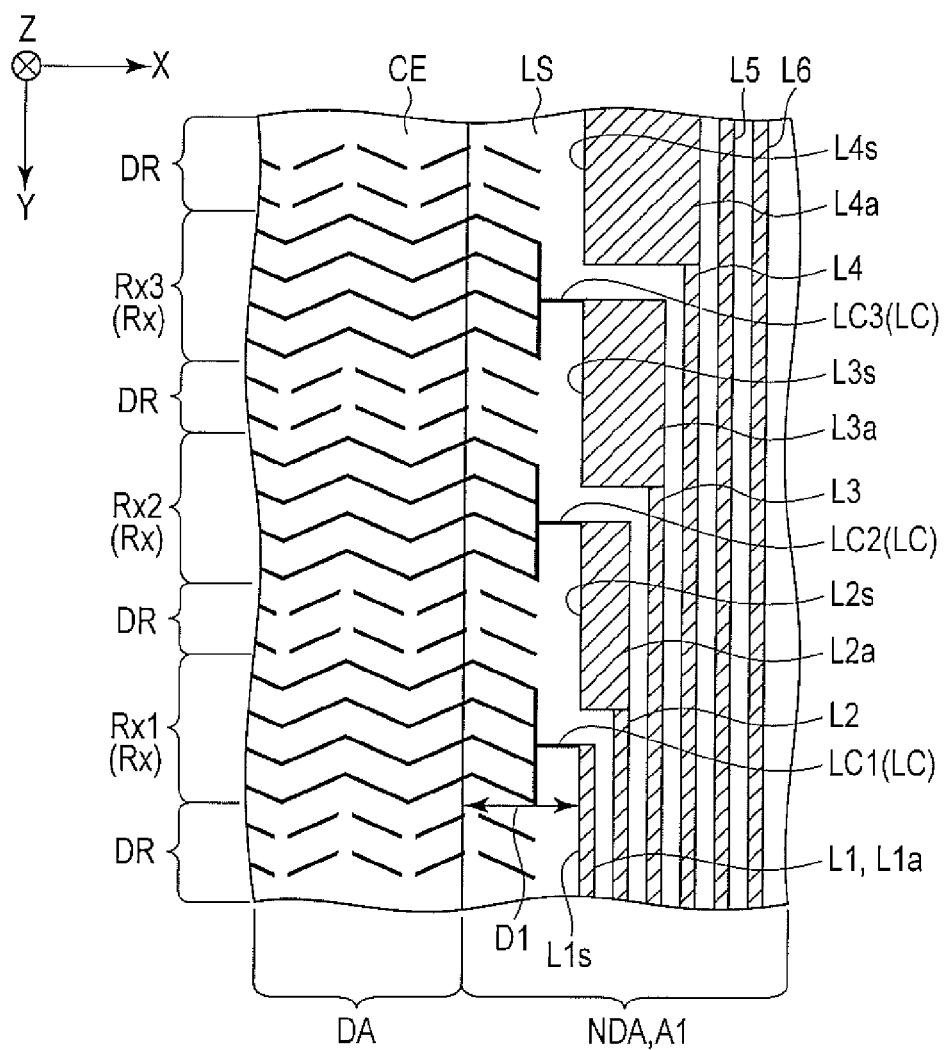
FIG. 16 is a plan view which schematically shows a variation 2 of the sensor of the liquid crystal display device of the second embodiment in a partly enlarged fashion.

Now, a variation 2 of the sensor-equipped liquid crystal display device DSP of the second embodiment will be explained. FIG. 16 is a plan view which schematically shows variation 2 of the capacitive sensor SE of the second embodiment in a partly enlarged fashion.

As shown in FIG. 16, the liquid crystal display device DSP of variation 2 is formed similarly to that of variation 1 except for the shape of lead lines L. The lead lines L include lead lines L1 to L6 which are arranged in this order in the non-display area NDA in first direction X. Amongst lead lines L1 to L6, lead line L1 is disposed to be in the closest proximity of the common electrode CE.

Lead line L1 is provided between the edge of the common electrode CE and lead line L2 in plane view and extends along the edge of the common electrode CE. Lead line L1 has a tip L1a connected to the connection line LC1. The tip L1a of lead line L1 and the detection electrode Rx1 are connected via the connection line LC1.

Lead line L2 is provided between lead line L1 and lead line L3 in plane view, extends in the extension direction of lead line L1, and has a tip L2a. The tip L2a goes over the tip of lead line L1 in a shape expanded in plane view. The tip L2a of lead line L2 and the detection electrode Rx2 are connected via the connection line LC2.

Lead line L3 is provided between lead line L2 and lead line L4 in plane view, extends in the extension direction of lead line L1, and has a tip L3a. The tip L3a goes over the tip of lead line L2 in a shape expanded in plane view. The tip L3a of lead line L3 and the detection electrode Rx3 are connected via the connection line LC3.

Lead lines L4 to L6 are formed in a similar manner. For example, lead line L4 has a tip L4a.

In the example depicted, the tip L2a protrudes to the display area DA side in a rectangular shape.

Lead line L1 has a side L1s which is opposed to the edge of the common electrode CE in plane view. The tip L2a has a side L2s which is opposed to the edge of the common electrode CE in plane view. The tip L3a has a side L3s which is opposed to the edge of the common electrode CE in plane view. The tip L4a has a side L4s which is opposed to the edge of the common electrode CE in plane view. Sides L1s, L2s, L3s, and L4s are disposed on the same plane. Here, the same plane is parallel to a Y-Z plane defined by second direction Y and third direction Z. Furthermore, sides L1s to L4s are parallel to second direction Y.

Furthermore, sides L1s to L4s (lead lines L1 to L6) are disposed to be apart from 30 μm or more from the edge of the common electrode CE in plane view.

The same advantages obtained from the second embodiment can be achieved in variation 2 of the sensor-equipped liquid crystal display device DSP of the second embodiment as described above. Lead lines L2 to L6 include the tips formed expanding in plane view. With this formation, the occupation ratio of lead lines L within the non-display area NDA (the density of the metal lines) can be increased. Consequently, the visibility of lead lines L by the reflecting light can be reduced, and the visibility of the pattern of lead lines L to users can be suppressed. In addition, the electrical resistance of lead lines L can be decreased. Furthermore, since the layout of lead lines L with linearly aligned sides L1s to L4s is made orderly, the visibility can further be reduced.

Third Embodiment

Figure 17:
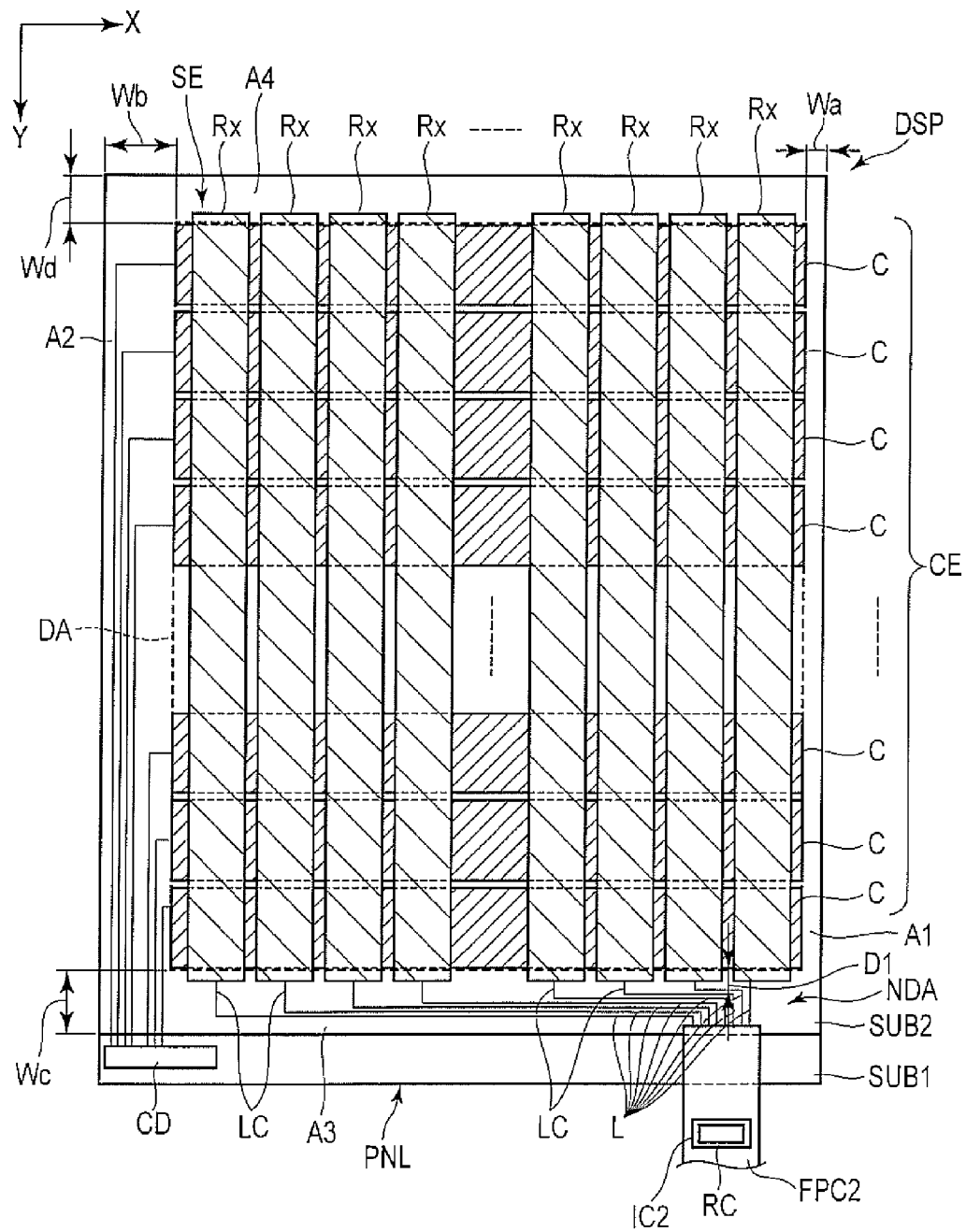
FIG. 17 is a cross-sectional view which schematically shows the structure of a sensor of a sensor-equipped liquid crystal display device of a third embodiment.

Now, a sensor-equipped liquid crystal display device DSP of the third embodiment will be explained in detail. FIG. 17 is a plan view which schematically shows the structure of the capacitive sensor SE of the present embodiment. In FIG. 17, a driver IC chip IC1 is omitted from the depiction; however, a common electrode driving circuit CD is disposed on driver IC chip IC1. The liquid crystal display device DSP of the present embodiment is different from that of the first embodiment in respects of a common electrode CE with divisional electrodes C each of which extends in first direction X and detection electrodes Rx which are extended substantially in second direction Y.

As shown in FIG. 17, the common electrode CE includes a plurality of divisional electrodes C which are arranged in second direction Y at intervals and extended substantially linearly in first direction X within the display area DA. Amongst the divisional electrodes C, the divisional electrode C positioned at the lowermost has a side edge opposed to lead lines L on the same plane on which the outer periphery of the display area DA is disposed. In the present embodiment, lead lines L are disposed at the lower end of the second substrate SUB2, the left side of each divisional electrode C is disposed on the same plane on which the left edge of the display area DA is disposed, and the right side of each divisional electrode C is disposed on the same plane on which the right edge of the display area DA is disposed.

The detection electrodes Rx are arranged in first direction X at intervals and are extended substantially linearly in second direction Y within the display area DA. The common electrode CE and the detection electrodes Rx are opposed to each other with various dielectrics interposed therebetween. Each of the divisional electrodes C is connected electrically to the common electrode driving circuit CD.

Lead lines L are disposed within the non-display area NDA and are electrically connected to the detection electrodes Rx one to one. In the example depicted, lead lines L are disposed within the non-display area NDA along one end of the display area DA. Lead lines L with such a structure are disposed on the second substrate SUB2 as with the detection electrodes Rx. Each of lead lines L is electrically connected o the detection circuit RC via a flexible printed circuit FPC2. Furthermore, as in the above examples, the lead line L in the closest proximity of the edge of the common electrode CE is disposed to be apart from the edge of the common electrode CE with distance D1 of 30 μm or more in plane view.

Here, widths Wa, Wb, Wc and Wd are in the range of 0.5 to 1.5 mm. Note that width Wa and width Wb should preferably be the same.

According to the sensor-equipped liquid crystal display device DSP of the third embodiment with the above-described feature, the liquid crystal display device DSP comprises the liquid crystal display panel PNL and the capacitive sensor SE disposed on the liquid crystal display panel. Therefore, the same advantage obtained in the second embodiment can be achieved in the present embodiment. Additionally, as compared to the example shown in FIG. 11, the length of the lead line L interconnecting between each detection electrode Rx and flexible printed circuit FPC2 can be reduced and the noise in lead lines L can be further decreased.

As can be understood from the above, the sensor-equipped liquid crystal display device DSP which can detect input positional data accurately can be achieved.

Variation 1 of Third Embodiment

Figure 18:
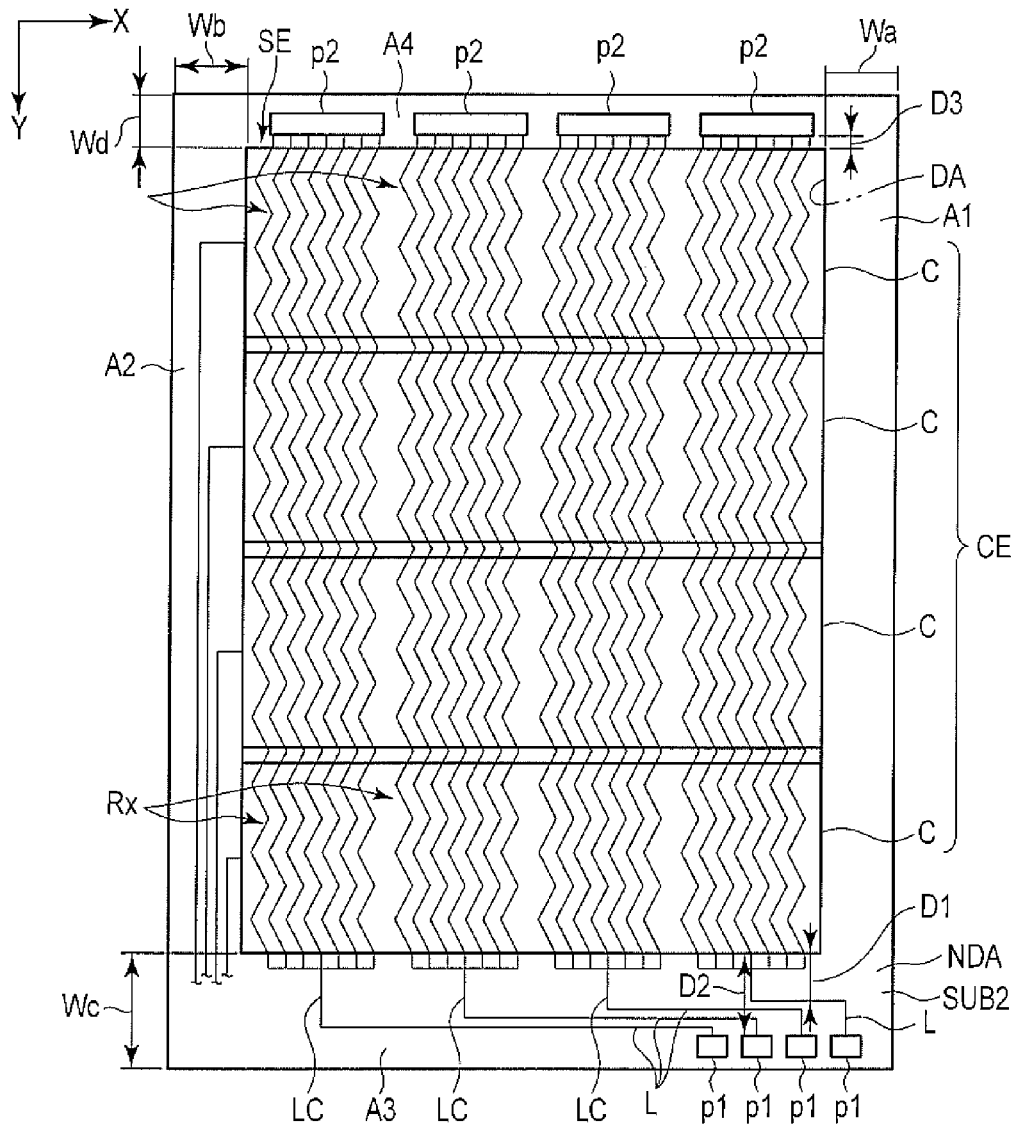
FIG. 18 is a plan view which schematically shows a variation 1 of the sensor of the sensor-equipped liquid crystal display device of the third embodiment.

Now, a variation 1 of the sensor-equipped liquid crystal display device DSP of the third embodiment will be explained. FIG. 18 is a plan view which schematically shows variation 1 of the capacitive sensor SE of the third embodiment.

As shown in FIG. 18, the capacitive sensor SE includes a plurality of first pads p1 and a plurality of second pads p2. The first pads p1 are used to read a read signal (sensor output value) Vr from the detection electrodes Rx. The second pads p2 are used to inspect a resistance of the detection electrodes Rx. The first pads p1 and second pads p2 are disposed above the surface (external surface ES) of the second insulating substrate 20 within the non-display area NDA. A flexible printed circuit FPC2 is electrically connected to the first pads p1. Each detection electrode Rx has an end which is electrically connected to first pad p1 via a connection line LC and a lead line L. Each detection electrode Rx has other end which is electrically connected to second pad p2.

Furthermore, in this variation 1, the lead line L which is in the closest proximity of the edge of the common electrode CE is disposed to be apart from the edge of the common electrode CE with distance D1 of 30 μm or more in plane view. The first pads p1 are disposed to be apart from the edge of the common electrode CE with distance D2 of 30 μm or more in plane view. In this variation 1, D1<D2 is satisfied. The second pads p2 are disposed to be apart from the edge of the common electrode CE with distance D3 of 30 μm or more in plane view.

Here, widths Wa, Wb, Wc and Wd are in the range of 0.5 to 1.5 mm. Note that width Wa and width Wb should preferably be the same.

According to variation 1 of the sensor-equipped liquid crystal display device DSP of the third embodiment with the above-described feature, variation 1 can achieve the same advantage obtained in the third embodiment. If inspection pads such as second pads p2 are disposed in the device, they are disposed to be apart from the edge of the common electrode CE with distance D1. Thus, the noise can be reduced and the decrease of the signal-to-noise ratio can be suppressed.

Variation 2 of Third Embodiment

Figure 19:
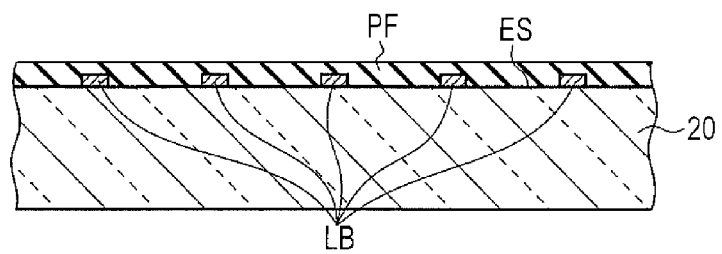
FIG. 19 is a cross-sectional view which schematically shows the structure of a variation 2 of the sensor of the sensor-equipped liquid crystal display device of the third embodiment.

Now, a variation 2 of the sensor-equipped liquid crystal display device DSP of the third embodiment will be explained. FIG. 19 is a cross-sectional view which schematically shows variation 2 of the capacitive sensor SE of the third embodiment.

As shown in FIG. 19, a sensor SE includes a protective film PF. The protective film PF is disposed above the surface (external surface ES) of the second insulating substrate 20 and covers metal lines. As metal lines to be covered with the protective film PF, detection electrodes Rx (detection lines LB), dummy electrodes DR, connection lines LC, and lead lines L are named. For example, the protective film PF is disposed from the display area DA to reach the non-display area NDA while pads (first pads p1 and second pads p2) are exposed therefrom. The protective film PF may be a transparent inorganic film or a transparent organic film. In this variation 2, the protective film PF is an organic film which has better transparency than does an inorganic film.

According to variation 2 of the sensor-equipped liquid crystal display device DSP of the third embodiment with the above-described feature, variation 2 can achieve the same advantage obtained in the third embodiment. Furthermore, the protective film PF of the liquid crystal display device DSP can protect the metal lines.

Fourth Embodiment

Now, a sensor-equipped liquid crystal display device DSP of the fourth embodiment will be explained in detail. FIG. 20 is a cross-sectional view which schematically shows the structure of a part of the sensor-equipped liquid crystal display device DSP of the present embodiment.

As shown in FIG. 20, lead lines L are disposed to be apart from the inner periphery of the frame-like peripheral light shielding layer LS in plane view. The peripheral light shielding layer LS is, as mentioned above, disposed within the non-display area NDA and includes the inner periphery which matches the outer periphery of the display area DA in plane view.

A distance between the inner periphery of the peripheral light shielding layer LS and lead lines L in plane view is here given first distance M. In other words, the first distance M is a distance between the inner periphery of the peripheral light shielding layer LS and lead lines L in a direction along the surface (external surface ES, display surface) of the second insulating substrate 20. Furthermore, a distance between the peripheral light shielding layer LS and lead line L in a direction parallel to the normal of the surface of the second insulating substrate 20 is given second distance g. The first distance M is, specifically, a distance from the inner periphery of the peripheral light shielding layer LS to a side of the lead line L which is opposed to the inner periphery of the peripheral light shielding layer LS. Furthermore, the second distance g is, specifically, a distance between the surface of the peripheral light shielding layer LS and the surface of the lead line L those are opposed to each other.

A study conducted by the inventors of the present invention with associates showed that the first distance M should preferably be 0.4 times of the second distance g or more (M/g≥0.4). Furthermore, the first distance M should more preferably be 0.54 times of the second distance g or more (M/g≥0.54).

Now, a technical significance of M/g≥0.4 is explained.

First, a sensor-equipped liquid crystal display device DSP for first examination was prepared. In the sensor-equipped liquid crystal display device DSP for first examination, g=150 μm, M=0 μm, and M/g=0. Here, the second insulating substrate 20 has a thickness of 150 μm. Since lead lines L are disposed above the peripheral light shielding layer LS, lead lines L are made invisible in the normal of the input surface IS of the liquid crystal display device DSP even when light transmits therein. That is, lead lines L are prevented from being viewed when θ1=0°.

Furthermore, a study was conducted by the inventors of the present application with associates to determine whether or note lead lines L are visible from different directions inclined from the normal of the input surface IS of the sensor-equipped liquid crystal display device DSP for first examination. The study confirmed that lead lines L were prevented from being viewed when the viewing angle $\theta 1=20°$, $30°$, $35°$, $55°$, $60°$, and $70°$ in addition to $0°$. However, the study showed that the transmitting light from the display area DA was partly unshielded by the peripheral light shielding layer LS and lead lines L were visible when $\theta 1=40°$, $45°$, and $50°$ by this transmitting light. Lead lines L were visible most clearly when $\theta 1=45°$.

Then, different kinds of sensor-equipped liquid crystal display devices DSP for second examination were prepared by the inventors of the present application and associates to determine whether or not lead lines L were visible when $\theta 1=45°$. FIG. 21 is a table which shows M/g values and determination results when the first distance M and the second distance g are changed.

As shown in FIG. 21, fifteen kinds of sensor-equipped liquid crystal display devices DSP for second examination were prepared. The second distance g takes 150, 200, and 300 μm. In the liquid crystal display device DSP, three kinds of second insulating substrates 20 having a thickness of 150, 200, and 300 μm are used. The first distance M takes 0, 30, 60, 90, and 120 μm. When lead lines L were not visible at all, Lv. 1 was given. When lead lines L were hardly visible, Lv. 2 was given, and when lead lines L were visible, Lv. 3 was given.

As can be understood from FIG. 21, when M/g=0, 0.1, 0.15, 0.2, and 0.3, lead lines L were recognized by the inventors of the present application and associates. However, when M/g=0.4, lead lines L were hardly recognized by the inventors of the present application and associates, and when M/g=0.5, 0.6, and 0.7, lead lines L were not at all recognized by the inventors of the present application and associates.

As can be understood from the subjective visual evaluation of lead lines L by the inventors of the present application and associates, M/g≥0.4 was acknowledged preferable and M/g≥0.5 was acknowledged more preferable. With this condition, the visibility of lead lines L from an oblique direction ($\theta 1=45°$) can be reduced.

Then, a sensor-equipped liquid crystal display device DSP for third examination was prepared by the inventors of the present application and associates to perform an objective evaluation of the visibility of lead lines L. In the sensor-equipped liquid crystal display device DSP for third examination, g=150 μm. That is, in the sensor-equipped liquid crystal display device DSP for third examination, a second insulating substrate 20 having a thickness of 150 μm is used. The index of refraction n1 of the second insulating substrate 20 is 1.5. A theoretical value of M/g with respect to a viewed angle $\theta 1$ was calculated to perform the objective evaluation.

For example, when $\theta 1=45°$, the value of M/g (theoretical value) can be calculated as follows.

As shown in FIG. 20, the inner angle formed by the transmitting light and the normal of the input surface IS of the liquid crystal display device DSP for third examination is given $\theta 2$. Then, a relationship between the value of M/g and the angle $\theta 2$ will be expressed by the following Formula 1.

$$\frac{M}{g} = \tan\theta_2 \quad \text{(Formula 1)}$$

$$= \frac{\sin\theta_2}{\sqrt{1-\sin^2\theta_2}}$$

Furthermore, a relationship between the angle $\theta 2$ and the angle $\theta 1$ will be expressed by the following Formula 2.

$$\sin\theta_2 = \frac{\sin\theta_1}{n_1} = \frac{\sin\theta_1}{1.5} \quad \text{(Formula 2)}$$

From the Formula 1, Formula 2, and $\theta 1=45°$, the value of M/g can be calculated as in the following Formula 3.

$$\frac{M}{g} = \frac{\sin\theta_2}{\sqrt{1-\sin^2\theta_2}} \quad \text{(Formula 3)}$$

$$= \frac{\frac{\sin 45}{1.5}}{\sqrt{1-\left(\frac{\sin 45}{1.5}\right)^2}}$$

$$= 0.535$$

Note that, from the Formula 3 and g=150 μm, the first distance M will be: M=80.25 μm.

The above objective evaluation of the visibility of lead lines L showed that the value of M/g should preferably be 0.54 or more when $\theta 1=45°$. In other words, the first distance M should preferably be 80 μm or more.

As can be understood from the above, theoretically, when the condition M/g≥0.54 is adopted, the visibility of lead lines L from the angle 45° ($\theta 1=45°$) can be reduced.

Figure 22:
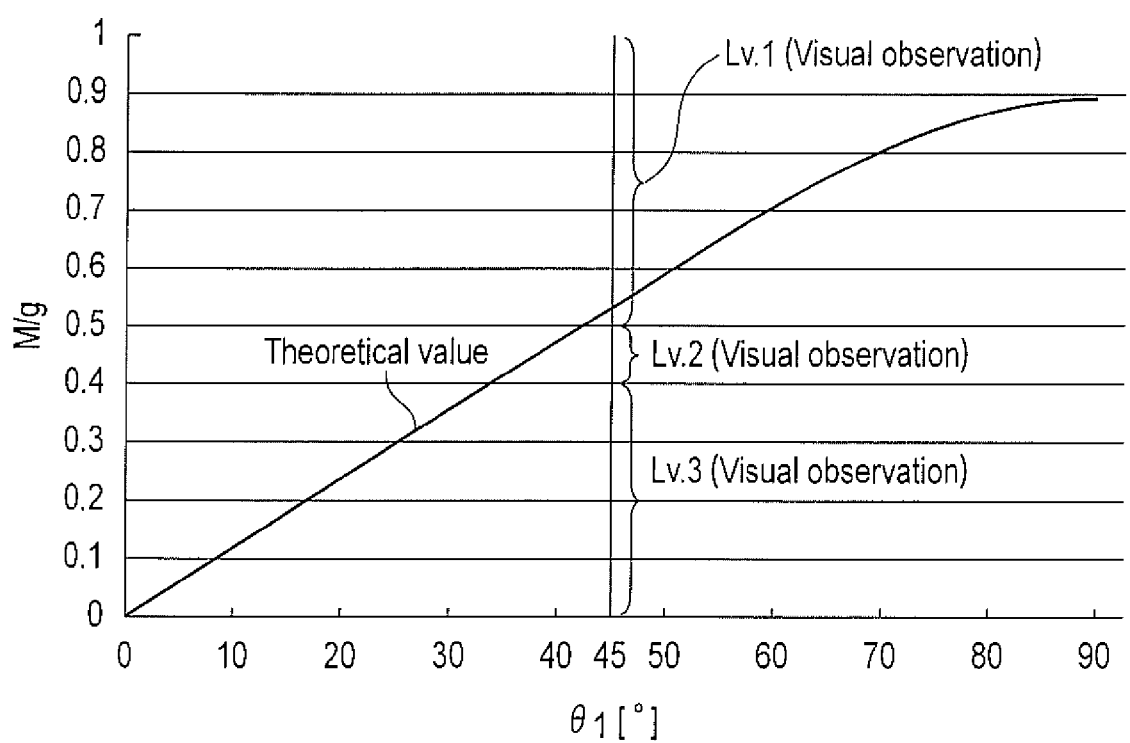
FIG. 22 is a graph which shows a change in M/g values with respect to viewing angles of the liquid crystal display device measured in the sensor-equipped liquid crystal display device of the fourth embodiment.

Furthermore, the values of M/g (theoretical values) when $0°≤\theta 1<45°$ and $45°<\theta 1≤90°$ were calculated by the inventors of the present application and associates in addition to the M/g value calculated when $\theta 1=45°$. FIG. 22 is a graph showing a change in the value of M/g with respect to the viewing angle $\theta 1$ of the liquid crystal display device DSP for third examination. Note that, symbols corresponding to Lv. 1, Lv. 2, and Lv. 3 are put in FIG. 22 to show the results of subjective visual evaluation of the visibility of lead lines L conducted by the inventors of the present application and associates. FIG. 22 thus shows the values of M/g in the subjective evaluation and the values of M/g in the objective evaluation maintain consistency when $\theta 1=45°$.

As can be understood from the above, to summarize the subjective evaluation by the inventors and objective evaluation, the m/g value should preferably be ≥0.4, or more preferably, ≥0.54.

According to the sensor-equipped liquid crystal display device DSP of the fourth embodiment with the above-described feature, the liquid crystal display device DSP comprises the liquid crystal display panel PNL and the capacitive sensor SE disposed on the liquid crystal display panel. Therefore, the same advantage obtained in the second embodiment can be achieved in the present embodiment.

The first distance M should preferably be 0.4 times of the second distance g or more. When this condition is satisfied, the peripheral light shielding layer LS can shield the transmitting light in such a manner that lead lines L are almost invisible. Furthermore, the first distance M should preferably be 0.54 times of the second distance g or more. When this condition is satisfied, the peripheral light shielding layer LS can shield the transmitting light in such a manner that lead lines L are completely invisible.

As can be understood from the above, the sensor-equipped liquid crystal display device DSP which can detect input positional data accurately can be achieved.

Variation 1 of Fourth Embodiment

Figure 23:
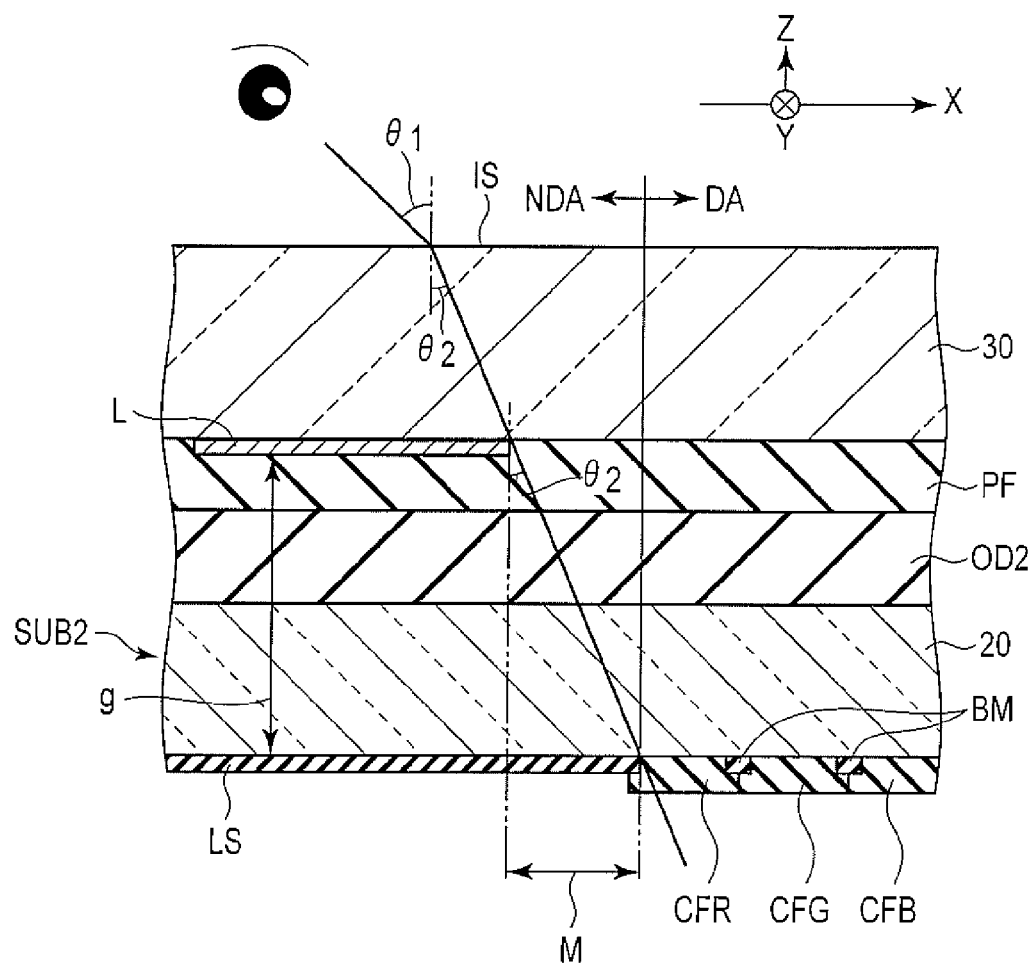
FIG. 23 is a cross-sectional view which schematically shows the structure of a variation 1 of the sensor-equipped liquid crystal display device of the fourth embodiment.

Now, a variation 1 of the sensor-equipped liquid crystal display device DSP of the fourth embodiment will be explained. FIG. 23 is a cross-sectional view which schematically shows a part of variation 1 of the sensor-equipped liquid crystal display device DSP of the fourth embodiment.

As shown in FIG. 23, the liquid crystal display device DSP includes a third insulating substrate 30 which is different from the first insulating substrate 10 and the second insulating substrate 20. The third insulating substrate 30 is a light transmissive substrate such as a glass substrate and a resin substrate. In this embodiment, the third insulating substrate 30 consists of glass to be used as a cover glass on the surface of the liquid crystal display device DSP. A metal pattern of a capacitive sensor SE and the protective film PF are formed above the third insulating substrate 30. An input surface IS of the liquid crystal display device DSP is the surface of the third insulating substrate 30.

In this variation 1, the m/g value should preferably be ≥0.4, or more preferably, ≥0.54. Here, the second distance g is the sum of a thickness of the second insulating substrate 20, a thickness of the second optical element OD2, and a thickness of the protective film PF within the area opposed to metal members (lead lines L).

Variation 2 of Fourth Embodiment

Now, a variation 2 of the sensor-equipped liquid crystal display device DSP of the fourth embodiment will be explained. A peripheral light shielding layer LS may shield the transmitting light in such a manner that metal members other than lead lines L are almost invisible or totally invisible.

As the metal members, pads such as second pads p2 can be named for instance. In that case, a distance in plane view between the inner periphery of the peripheral light shielding layer LS and the second pads p2 should preferably be 0.4 times of the second distance g or more, or more preferably, 0.54 times of the second distance g or more.

Fifth Embodiment

Now, a sensor-equipped liquid crystal display device DSP of fifth embodiment will be explained in detail. The liquid crystal display device DSP of the present embodiment is formed similarly to the liquid crystal display device DSP of the second embodiment except that a relationship between the chromaticity of the light reflected by lead lines L and the chromaticity of the light reflected by the peripheral light shielding layer LS is adjusted.

When being viewed from the display surface side, a peripheral light shielding layer is disposed below (side deeper than) the lead lines. Thus, from the display surface side, the lead lines are not necessarily covered by the peripheral light shielding layer. Therefore, when external light of ambient is reflected upon the peripheral light shielding layer, the lead lines may possibly be recognized by the eye depending on the light reflection performance of the lead lines even if they are provided on the peripheral light shielding layer.

As to this matter, the visibility of the lead lines will be reduced by adjusting the light reflection performance; however, a thickness of a metal film forming the lead lines or other conditions may vary the light reflection performance of the lead lines. If a color difference between the light reflected by the lead lines L and the light reflected by the peripheral light shielding layer LS becomes greater, the pattern of the lead lines L (metal lines) becomes recognizable more easily in the reflecting light.

The inventors of the present application and associates found that the visibility of the lead lines L by the reflecting light can be reduced by minimizing the color difference between the light reflected by the lead lines L and the light reflected by the peripheral light shielding layer LS. Specifically, the inventors of the present application and associates found that the pattern of the lead lines L is hard to recognize when the color difference between the light reflected by the lead lines L and the light reflected by the peripheral light shielding layer LS via a polarizer (second optical element OD2) is 50 or less.

Now, examples 1 to 16 in which the color difference is set to 50 or less and comparative examples 1 to 6 in which the color difference exceeds 50 are explained. Here, the color difference (a difference in chromaticity) is adjusted by adjusting the chromaticity of the light reflected by the lead lines L while the chromaticity of the light reflected by the peripheral light shielding layer LS is fixed. FIG. 24 is a table which shows: (1) color of light reflected by lead lines L based on xyY color system; (2) color of light reflected by lead lines L based on L*a*b* color system; (3) color difference ΔEab1 between light reflected by lead lines L and light reflected by peripheral light shielding layer LS without polarizer (second optical element OD2); and (4) color difference ΔEab2 between light reflected by lead lines L and light reflected by peripheral light shielding layer LS with polarizer (second optical element OD2), regarding examples 1 to 16 of the present embodiment and comparative examples 1 to 6.

Figure 25:
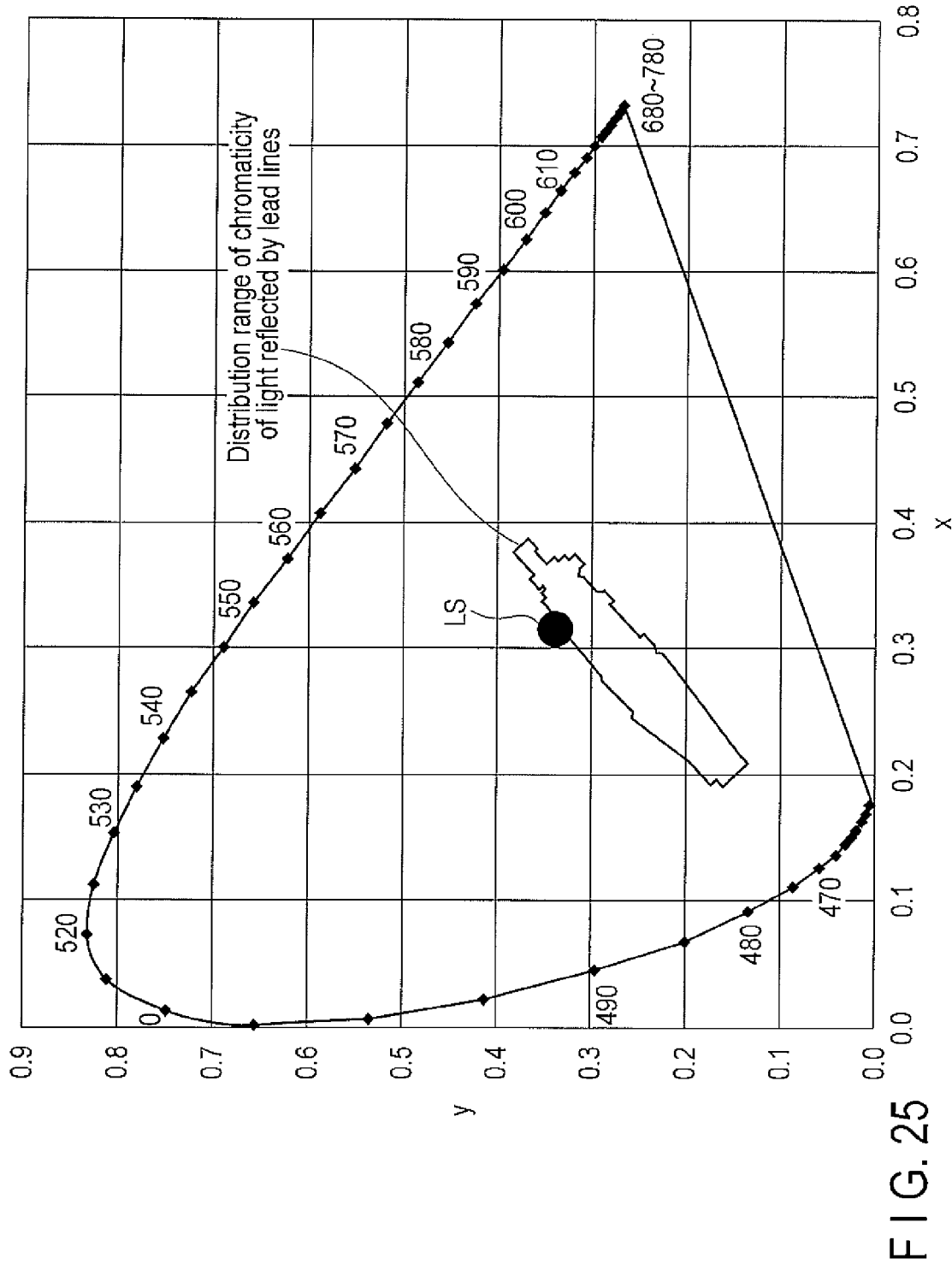
FIG. 25 is an xy chromaticity diagram showing the color of light reflected by the lead lines L based on the xyY color system in each of the examples 1 to 16 and comparative examples 1 to 6 in FIG. 24.

FIG. 25 is an xy chromaticity diagram showing the color of light reflected by the lead lines L based on xyY color system in each of the examples 1 to 16 and comparative examples 1 to 6 in FIG. 24. FIG. 25 shows the chromaticity of light reflected by the peripheral light shielding layer LS. Note that, in the xyY color system, the chromaticity coordinates are represented by x and y and brightness is represented by Y. Note that in the L*a*b* color system, the brightness is represented by L* and chromaticity of hue and chroma is represented by a* and b*.

According to the fifth embodiment with the above-described feature, the sensor-equipped liquid crystal display device DSP includes the liquid crystal display panel PNL and the capacitive sensor SE disposed on the liquid crystal display panel. Therefore, the same advantage obtained in the second embodiment can be achieved in the present embodiment.

Through the polarizer (second optical element OD2), the color difference ΔEab2 between the light reflected by the lead lines L and the light reflected by the peripheral light shielding layer LS is 50 or less. Therefore, the visibility of the pattern of lead lines L can be lowered.

As can be understood from the above, the sensor-equipped liquid crystal display device DSP which can detect input positional data accurately can be achieved.

Variation 1 of Fifth Embodiment

Now, a variation 1 of the sensor-equipped liquid crystal display device DSP of the fifth embodiment is explained.

Through the polarizer (second optical element OD2), the color difference to be 50 or less may be between the light reflected by pads (for example, second pads p2) and the light reflected by the peripheral light shielding layer LS. Thereby, the visibility of the pattern of pads can be lowered.

Variation 2 of Fifth Embodiment

Now, a variation 2 of the sensor-equipped liquid crystal display device DSP of the fifth embodiment will be explained. In this variation 2, the liquid crystal display device DSP may further include a protective film PF covering metal members such as lead lines L and detection electrodes Rx. The protective film PF has no substantial effect on the color difference. Thus, as in the above, the visibility of the pattern of metal members can be maintained low.

Now, other variations of the second to fifth embodiments will be explained.

A glare reduction treatment may be added to the metal members (for example, lead lines L and detection lines LB) above the surface (external surface ES) of the second insulating substrate 20 to reduce the glare by the reflecting light. For example, a light reflection preventing layer may be laminated on the metal lines to reduce the glare by the reflecting light. Thereby, the liquid crystal display device DSP maintains its exterior unharmed by glaring metal lines due to the reflecting light.

The lead lines L, detection electrodes Rx, and connection lines LC may be provided above the inner surface of the second insulating substrate 20 (the surface of the second insulating substrate 20 opposing the first substrate SUB1). Alternatively, the lead lines L, detection electrodes Rx, and connection lines LC may be provided above the inner surface of the first insulating substrate 10 (the surface opposed to the second substrate SUB2). That is, the lead lines L, detection electrodes Rx, and connection lines LC may be provided with any of the layers including the liquid crystal display panel PNL and the cover thereof.

If the lead lines L, detection electrodes Rx, and the like are provided between the first insulating substrate 10 and the second insulating substrate 20, driver IC chips IC1 and IC2 may be formed integrally. That is, driver IC chips IC1 and IC2 can be integrated in a single driver IC chip (drive part). In that case, the single driver IC chip is connected to the liquid crystal display panel PNL and the control module CM. Furthermore, the single driver IC chip is connected to the sensor SE (lead lines L) via the lines and electrodes formed on the liquid crystal display panel PNL.

Furthermore, the first driver described above is not limited to driver IC chip IC1 and can be changed variously as long as it supplies a common driving signal during the display drive time in which images are displayed by pixel electrodes PE and supplies a sensor driving signal in the sensing drive time in which sensing is performed using the detection electrodes Rx. Moreover, the second driver described above is not limited to driver IC chip IC2 and can be changed variously as long as it is connected to the lead lines L to detect a sensor output value of detection electrodes Rx output from the lead lines L during the sensing drive time.

Now, the technical matters related to the above-described second to fifth embodiments and their variations are specified in the following (C1b) to (C9b).

(C1b) A sensor-equipped display device comprising:
a display panel comprising a display area, non-display area outside the display area, common electrode provided within the display area, the common electrode including an edge overlapping an outer periphery of the display area, and pixel electrode provided within the display area;
the sensor configured to receive a sensor signal from the common electrode;
a first driver configured to supply a write signal to the common electrode and to produce a sensor signal between the common electrode and the sensor; and
a second driver connected to the sensor and configured to read a read signal indicative of a change in the sensor signal, wherein
the sensor includes a detection electrode provided at least with the display area and is configured to produce a read signal between the common electrode and itself, a lead line provided within the non-display area to connect the detection electrode to the second driver, and a connection line connected between the detection electrode and the lead line, and
the lead line is provided within the non-display area to be apart from the edge of the common electrode with a distance of 30 µm or more.

(C2b) The sensor-equipped display device of (C1b), wherein
the detection electrode consists of a plurality of detection lines, and
the detection lines, connection line and lead line are metal.

(C3b) The sensor-equipped display device of (C1b), wherein
the sensor further comprises other lead line, other detection electrode, and other connection line,
the lead line is provided between the edge of the common electrode and the other lead line, extends along the edge of the common electrode, and includes a tip connected to the connection line,
the other lead line is provided within the non-display area, is extended in a direction of the extension of the lead line, and includes expanded tip formed beyond the tip of the lead line,
the other connection line connects between the tip of the other lead line and the other detection electrode,
the tip of the other lead line is provided to be apart from the edge of the common electrode with a distance of 30 µm or more.

(C4b) The sensor-equipped display device of (C3b), wherein a side of the lead line opposed to the edge of the common electrode and side of the tip of the other lead line opposed to the edge of the common electrode are disposed on the same plane.

(C5b) The sensor-equipped display device of (C1b), wherein
the display panel further comprises a frame-like peripheral light shielding layer provided within the non-display area, the peripheral light shielding layer having an inner periphery overlapping the outer periphery of the display area, and,
where a distance between the inner periphery of the peripheral light shielding layer and the lead line in a direction along a display surface of the display panel is given a first distance, and the peripheral light shielding layer and the lead line in a direction parallel to a normal of the display surface is given a second distance, the first distance is 0.4 times of the second distance or more.

(C6b) The sensor-equipped display device of (C1b), wherein
the sensor further comprises a first pad and a second pad provided on the non-display area of the display panel, and the detection electrode includes one end which is electrically connected to the first pad via the connection line and the lead line, and the other end which is electrically connected to the second pad.

(C7b) The sensor-equipped display device of (C1b), wherein the display panel further comprises a first substrate and a second substrate disposed opposite to each other with a gap therebetween, and the common electrode and the pixel electrode are disposed on the first substrate at its side opposed to the second substrate.

(C8b) The sensor-equipped display device of (C1b), wherein the detection electrode extends in a first direction, the lead line extends in a second direction orthogonal to the first direction, the lead line is provided to be apart from the edge of the common electrode in the first direction with the distance, the common electrode includes a plurality of stripe-like divisional electrodes arranged in the first direction at intervals and extended in the second direction, and a divisional electrode at an end of the divisional electrodes includes a side edge opposed to the lead line which overlaps the outer periphery of the display area.

(C9b) The sensor-equipped display device of (C1b), further comprising a polarizer disposed in the display area to reach the non-display area, wherein the display panel further comprises a frame-like peripheral light shielding layer provided within the non-display area, and a color difference between light reflected by the lead line and light reflected by the peripheral light shielding layer through the polarizer is 50 or less.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, in the above embodiments, a liquid crystal display device has been exemplified as a display device; however, the above embodiments can be applied to various flat-panel display devices including organic EL (electroluminescent) display devices, other self-luminescent display devices, electronic paper display devices including electrophoresis elements, etc. Furthermore, the above-described embodiments can be applied to various display sizes, that is, can be applied to a small, medium, or large display.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A sensor-equipped display device comprising:
a display panel having a display area, a non-display area surrounding the display area and a boundary therebetween, the display panel comprising:
a common electrode, a pixel electrode and a detection electrode in a stacked arrangement in a display area,
a shield electrode disposed between the boundary and the common electrode,
a connection line connected to the detection electrode, and
a lead line provided in the non-display area, wherein the lead line is wired along the boundary and electrically connected to the detection electrode via the connection line;
a first driver connected to the common electrode, wherein the first driver supplies a common driving signal to the common electrode during a display drive time when an image is displayed with the common electrode and the pixel electrode, and wherein the first driver supplies a sensor driving signal to the common electrode during a sensing drive time when sensing is performed with the common electrode and the detection electrode;
a second driver connected to the lead line, wherein the second driver receives a sensor output value of the detection electrode from the lead line;
a third driver connected to the shield electrode, wherein the third driver supplies the common driving signal to the shield electrode during the display drive time, and wherein the third driver maintains the shield electrode at a potential different from a potential of the sensor driving signal during the sensing drive time;
a first gap in the sensing drive time provided between the lead line and the common electrode; and
a second gap in the display drive time provided between the lead line and shield electrode, wherein the first gap is wider than the second gap.

2. The sensor-equipped display device of claim 1, wherein the third driver maintains the shield electrode at ground potential during the sensing drive time.

3. The sensor-equipped display device of claim 1, wherein the third driver switches the shield electrode to an electrically floating state during the sensing drive time.

4. The sensor-equipped display device of claim 1, wherein the display panel further comprises a first substrate and a second substrate arranged opposite to each other with a gap therebetween,
wherein the common electrode, the pixel electrode, and the shield electrode are disposed on the first substrate at an inner surface side, and
wherein the detection electrode, the connection line, and the lead line are disposed on the second substrate at an outer surface side.

5. The sensor-equipped display device of claim 1, wherein at least a portion of the detection electrode is bundled by the connection line.

6. A sensor-equipped display device comprising:
a display panel having a display area, a non-display area surrounding the display area and a boundary therebetween, the display panel comprising:
a plurality of common electrodes, a plurality of pixel electrodes and a plurality of detection electrodes in a stacked arrangement in the display area,
a connection line connected to the detection electrodes, and a lead line provided in the non-display area, wherein the lead line is wired along the boundary and electrically connected to the detection electrodes via the connection line;

a first driver connected to the common electrodes, wherein the first driver supplies a common driving signal to the common electrodes during a display drive time when an image is displayed with the common electrodes and the pixel electrodes, and wherein the first driver supplies a sensor driving signal to the common electrodes except to one of the common electrodes that is closest to the lead line during a sensing drive time when sensing is performed with the common electrodes and the detection electrodes; and a second driver connected to the lead line, wherein the second driver receives a sensor output value of the detection electrodes from the lead line, wherein in each of the driving time, the lead line and the common electrode which is the closest to the lead line and is provided with the driving signal are spaced apart with a certain gap, and wherein the gap is wider in the sensing drive time than in the display drive time.

7. The sensor-equipped display device of claim 6, wherein the display panel further comprises a first substrate and a second substrate arranged opposite to each other with a gap therebetween, wherein the common electrodes, the pixel electrodes, and the shield electrode are disposed on the first substrate at an inner surface side, and wherein the detection electrodes, the connection line, and the lead line are disposed on the second substrate at an outer surface side.

8. The sensor-equipped display device of claim 6, wherein at least a portion of the detection electrodes are bundled by the connection line.

* * * * *